United States Patent
Shima et al.

(10) Patent No.: US 9,083,131 B2
(45) Date of Patent: Jul. 14, 2015

(54) BRUSH DEVICE AND MOTOR

(75) Inventors: Toshiyuki Shima, Hamamatsu (JP); Ryousuke Oguri, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 344 days.

(21) Appl. No.: 13/589,456

(22) Filed: Aug. 20, 2012

(65) Prior Publication Data

US 2013/0049523 A1 Feb. 28, 2013

(30) Foreign Application Priority Data

Aug. 25, 2011 (JP) .................................. 2011-184069
Jul. 27, 2012 (JP) .................................. 2012-167733

(51) Int. Cl.
*H02K 13/00* (2006.01)
*H01R 39/38* (2006.01)
*H02K 5/14* (2006.01)
*H02K 7/116* (2006.01)

(52) U.S. Cl.
CPC .............. *H01R 39/381* (2013.01); *H02K 5/148* (2013.01); *H02K 7/1166* (2013.01); *H02K 2213/03* (2013.01)

(58) Field of Classification Search
CPC ....... H02K 5/148; H02K 5/225; H01R 39/40; H01R 39/38
USPC .......... 310/239, 244, 245, 246, 240, 241, 242
See application file for complete search history.

(56) References Cited

U.S. PATENT DOCUMENTS

| | | | | |
|---|---|---|---|---|
| 5,019,741 | A * | 5/1991 | Fukui et al. | 310/239 |
| 5,387,831 | A * | 2/1995 | Yang | 310/242 |
| 2005/0029895 | A1* | 2/2005 | Neidhart | 310/239 |
| 2007/0001535 | A1* | 1/2007 | Mori | 310/239 |

FOREIGN PATENT DOCUMENTS

JP 2010-124518 6/2010

\* cited by examiner

*Primary Examiner* — Hanh Nguyen
(74) *Attorney, Agent, or Firm* — Christensen Fonder P.A.

(57) ABSTRACT

A brush holder extends substantially in a radial direction of a commutator. The brush holder includes a first inner side surface and a second inner side surface, which are separate from each other in the axial direction of the commutator. A torsion spring presses portions-to-be-pressed of a brush-rear end, thereby urging the brush toward the commutator. The portions-to-be-pressed are deviated from a brush-center line in the axial direction of the commutator. The brush is urged by the torsion spring, thereby bringing a brush-tip end into contact with the first inner side surface, and bringing the brush-rear end into contact with the second inner side surface.

6 Claims, 9 Drawing Sheets

C-C End Surface

BRUSH DEVICE AND MOTOR

BACKGROUND

The present invention relates to a brush device for bringing a brush into contact with a commutator. The invention also relates to a motor including the brush device.

A motor disclosed in Japanese Laid-Open Patent Publication 2010-124518 includes a brush device provided with a feed brush, which comes into contact with the outer peripheral surface of a commutator. The commutator is fitted over and fixed to a rotary shaft, which is rotated. A brush-tip end comes into contact with the outer peripheral surface of the commutator. The brush device further includes a cylindrical brush holder, which holds the brush inside thereof, and a spring, which urges a brush-rear end toward the commutator. In some cases, such a brush device uses a torsion spring as the spring, which urges the brush-rear end. If the torsion spring is used, the brush device can be made compact as compared with a case where a coil spring is used, for example. Generally, the torsion spring presses one point against a rear end surface of the brush, thereby urging the brush toward the commutator. The interior space of the brush holder is formed slightly larger than the outside shape of the brush, taking thermal expansion of the brush into account. Hence, when the rotary shaft is rotated, i.e., when the commutator is rotated, there is a problem in that the orientation of the brush is not easily stabilized in the brush holder and the contact state between the brush-tip end and the commutator becomes unstable.

To solve such a problem, according to the brush device described in Japanese Laid-Open Patent Publication 2010-124518, to bring the brush into contact with the commutator in a stable state, the brush-rear end is provided with a plate-like pressing member. By urging the pressing member by the torsion spring, the urging force of the torsion spring is transmitted to the brush through the pressing member.

According to the brush device described in Japanese Laid-Open Patent Publication 2010-124518, however, the torsion spring presses with its one point against the pressing member. Hence, the urging direction of the torsion spring against the pressing member is not easily stabilized. Therefore, the direction in which the brush is urged through the pressing member is not easily stabilized either, and the brush may rattle the brush holder, i.e., the brush moves irregularly. According to such a brush device, since the pressing member is additionally provided between the spring and the brush, the number of parts is increased.

It is an objective of the present disclosure to provide a brush device and a motor capable of suppressing rattling of a brush without increasing the number of parts.

SUMMARY

In accordance with one aspect of the present invention, a brush device is provided that includes a brush holder, a brush, and a torsion spring. The brush holder extends substantially in a radial direction of a commutator. The brush is accommodated in the brush holder with a gap between the brush holder and the brush. The brush includes a brush-tip end, which comes into contact with the commutator, and a brush-rear end located on a side opposite to the brush-tip end. The torsion spring urges the brush-rear end toward the commutator. The brush holder includes a first inner side surface and a second inner side surface, which are separate from each other in an axial direction of the commutator. The torsion spring urges the brush toward the commutator by pressing a portion-to-be-pressed of the brush-rear end, and the portion-to-be-pressed is located at a position deviated in the axial direction of the commutator from a brush-center line as a center line of the brush. By urging the brush by the torsion spring, the brush-tip end is brought into contact with the first inner side surface and the brush-rear end is brought into contact with the second inner side surface.

According to this disclosure, the torsion spring presses the portion-to-be-pressed, which is located at a position deviated from the brush-center line in the brush-rear end in the axial direction of the commutator. Hence, a rotational force for rotating the brush such that the brush-tip end and the brush-rear end are deviated in the axial direction of the commutator, i.e., rotation moment is prone to be applied to the brush. The brush, to which the rotational force is applied, comes into contact with and is pressed against one of the pair of the inner side surfaces on the side of the brush-tip end, and the brush comes into contact with and is pressed against the other one of the pair of the inner side surfaces on the side of the brush-rear end. Since it becomes difficult for the brush to move in the axial direction of the commutator in the brush holder, rattling and irregular movement of the brush in the axial direction of the commutator are suppressed. The brush comes into contact with the commutator in a stable state. The torsion spring presses the portion-to-be-pressed, which is located at a position deviated from the brush-center line at the brush-rear end in the axial direction of the commutator, rattling and irregular movement of the brush in the brush holder are suppressed. Therefore, the number of parts is not increased.

In accordance with another aspect of the present invention, the commutator includes a first commutator end, which is a first end in the axial direction, and a second commutator end, which is a second end on a side opposite from the first commutator end. The first inner side surface and the second inner side surface are inclined such that as they approach the commutator, they approach the first commutator end. The portion-to-be-pressed of the brush-rear end is located near the first commutator end with respect to the brush-center line of the brush-rear end.

According to this disclosure, if the torsion spring urges the brush-rear end in a direction substantially parallel to the radial direction of the commutator, the brush-tip end and the brush-rear end are easily rotated such that they are deviated in the axial direction of the commutator. Therefore, the brush-tip end comes into contact with one of the pair of the inner side surfaces, and the brush-rear end comes into contact with the other one of the pair of the inner side surfaces. The urging direction need not be a complicated direction. Therefore, this disclosure restrains the structure of the brush device from becoming complicated.

In accordance with another aspect of the present invention, the brush comes into contact with the commutator near the second commutator end with respect to the brush-center line.

This disclosure increases a rotational force for rotating the brush such that the brush-tip end and the brush-rear end are deviated in the axial direction of the commutator, the rotational force being generated by urging the brush by the torsion spring. The brush-tip end can strongly be pressed by one of the inner side surfaces, and the brush-rear end can strongly be pressed by the other inner side surface. Since it becomes difficult for the brush to move in the axial direction of the commutator in the brush holder, rattling of the brush in the axial direction of the commutator is further suppressed.

In accordance with another aspect of the present invention, the commutator includes a first commutator end, which is a first end in the axial direction, and a second commutator end, which is a second end on a side opposite from the first commutator end. The portion-to-be-pressed of the brush-rear end is located near the first commutator end with respect to the brush-center line of the brush-rear end. The brush comes into contact with the commutator near the second commutator end with respect to the brush-center line.

According to this disclosure, if the torsion spring urges the brush-rear end in the direction substantially parallel to the radial direction of the commutator, the brush-tip end and the brush-rear end are easily rotated such that they are deviated in the axial direction of the commutator. Therefore, the brush-tip end comes into contact with one of the pair of the inner side surfaces, and the brush-rear end comes into contact with the other one of the pair of the inner side surfaces. The urging direction of the brush urged by the torsion spring need not be the complicated direction. Therefore, this disclosure restrains the structure of the brush device from becoming complicated.

In accordance with another aspect of the present invention, the brush device further includes a pigtail for supplying electric power to the brush. The pigtail is connected to a portion of the brush-rear end on a side opposite from the portion-to-be-pressed with respect to the brush-center line.

According to this disclosure, the pigtail applies force to the brush the direction of which is substantially the same as that of a rotational force for rotating the brush such that the brush-tip end and the brush-rear end deviate in the axial direction of the commutator. The rotational force is generated by urging the brush by the torsion spring. Since it becomes more difficult for the brush to move in the axial direction of the commutator in the brush holder, rattling of the brush in the axial direction of the commutator is further suppressed.

In accordance with another aspect of the present invention, the portion-to-be-pressed is one of an even number of portions-to-be-pressed that are separate from one another in a circumferential direction of the commutator. The brush comes into contact with the commutator at one contact location of the brush. If a straight line that passes through the contact location and is parallel to the brush-center line is defined as a contact center line, the torsion spring presses the portions-to-be-pressed of the brush-rear end, and the same number of portions-to-be-pressed exist on each side of the contact center line when the commutator is viewed from its axial direction.

According to this disclosure, rattling and irregular movement of the brush in the circumferential direction of the commutator in the brush holder are suppressed.

In accordance with another aspect of the present invention, a following-recess, which opens on a side opposite from the brush-tip end, is formed in the brush-rear end. The torsion spring includes an urging end, which urges the brush-rear end. When the urging end is viewed form the axial direction of the commutator, the urging end has a pressing projection, which projects toward the brush-rear end in an arcuate form. In an inner surface of the following-recess, two of the portions-to-be-pressed that are separate from each other in the circumferential direction of the commutator are pressed by the pressing projection by inserting the pressing projection into the following-recess.

According to this disclosure, the pressing projection is inserted into the following-recess, and the pressing projection presses the two portions-to-be-pressed, which are separate from each other in the circumferential direction of the commutator in the inner surface of the following-recess. If the brush wears, the brush-rear end moves toward the commutator. As the brush wears, the tip end of the torsion spring, on which the pressing projection has been formed, rotates around a coil portion area of the torsion spring. Even if the tip end of the torsion spring, on which the pressing projection has been formed, rotates in this manner, the pressing projection is in its arcuate form projecting toward the brush-rear end when the commutator is viewed from the axial direction. Therefore, it is possible to maintain a state where the two portions-to-be-pressed, which are separate from each other in the circumferential direction of the commutator in the inner surface of the following-recess, are pressed by the pressing projection. Even if the brush wears, rattling of the brush in the circumferential direction of the commutator is suppressed.

In accordance with another aspect of the present invention, an end of the first inner side surface that contacts the brush-tip end and is close to the commutator includes a straight line portion. The straight line portion intersects the axial direction of the commutator at right angles, and intersects an extending direction of the brush holder at right angles. The brush-tip end comes into contact with the straight line portion.

According to this disclosure, since the brush-tip end comes into contact with the straight line portion, the brush can come into line contact or surface contact with the inner side surface. The straight line portion is straight, intersects the axial direction of the commutator at right angles and intersects the extending direction of the brush holder at right angles. If the brush is pressed at the brush-tip end against the straight line portion by an urging force of the torsion spring and the brush comes into line contact or surface contact with the straight line portion, the attitude of the brush is easily stabilized. Hence, rattling of the brush is further suppressed, and the brush comes into contact with the commutator in a more stable state.

In accordance with another aspect of the present invention, a motor is provided that includes a rotary shaft, which is rotated, a commutator, which is fixed to the rotary shaft such that the commutator can integrally rotate with the rotary shaft, and a brush device, which supplies electricity to the commutator. The brush device includes a brush holder extending substantially in a radial direction of the commutator, a brush and a torsion spring. The brush is accommodated in the brush holder with a gap between the brush holder and the brush. The brush includes a brush-tip end, which comes into contact with the commutator and a brush-rear end located on a side opposite from the brush-tip end. The torsion spring urges the brush-rear end toward the commutator. The brush holder includes a first inner side surface and a second inner side surface, which are separate from each other in an axial direction of the commutator. The torsion spring urges the brush toward the commutator by pressing a portion-to-be-pressed of the brush-rear end, the portion-to-be-pressed is located at a position deviated in the axial direction of the commutator from a brush-center line as a center line of the brush. By urging the brush by the torsion spring, the brush-tip end is brought into contact with the first inner side surface and the brush-rear end is brought into contact with the second inner side surface.

According to this disclosure, the motor includes the brush device, in which rattling and irregular movement of the brush holder are suppressed. Hence, noise caused by rattling of the brush is restrained from being generated in the motor. Since the brush is in contact with the commutator in a stable state, the brush is restrained from wearing excessively. Therefore, lifetime of the brush is restrained from being reduced, and the lifetime of the motor is increased.

In accordance with another aspect of the present invention, a brush device is provided that includes a brush holder extending substantially in a radial direction of a commutator, a brush, and a torsion spring. The brush is accommodated in the brush holder with a gap between the brush holder and the brush. The brush includes a brush-tip end, which comes into contact with the commutator and a brush-rear end located on a side opposite from the brush-tip end. The torsion spring urges the brush-rear end toward the commutator. The torsion spring presses an even number of portions-to-be-pressed of the brush-rear end that are separate from one another in a circumferential direction of the commutator.

According to this disclosure, rattling of the brush in the circumferential direction of the commutator in the brush holder is suppressed.

In accordance with another aspect of the present invention, the brush comes into contact with the commutator at one contact location of the brush. A brush-center line as a center line of the brush passes through the contact location when the commutator is viewed from its axial direction. The portion-to-be-pressed is one of an even number of portions-to-be-pressed. The same number of portions-to-be-pressed exist on each side of the brush-center line when the commutator is viewed from the axial direction.

According to this disclosure, the brush comes into contact with the commutator in a more stable state.

In accordance with another aspect of the present invention, a following-recess, which opens on a side opposite from the brush-tip end, is formed in the brush-rear end. An end of the torsion spring includes a pressing projection projecting toward the brush-rear end in an arcuate form when the commutator is viewed from the axial direction. The pressing projection is inserted into the following-recess. The number of the even number of portions-to-be-pressed is two. The two portions-to-be-pressed are separate from each other in the circumferential direction of the commutator in an inner surface of the following-recess.

According to this disclosure, the pressing projection is inserted into the following-recess, and the pressing projection presses the two portions-to-be-pressed, which are separate from each other in the circumferential direction of the commutator in the inner surface of the following-recess. If the brush wears, the brush-rear end moves toward the commutator. As the brush-rear end moves, the tip end of the torsion spring, on which the pressing projection has been formed, rotates around the coil portion area of the torsion spring. Even if the tip end of the torsion spring, on which the pressing projection has been formed, rotates in this manner, the pressing projection remains in its arcuate form projecting toward the brush-rear end when the commutator is viewed from the axial direction. Therefore, it is possible to maintain a state where the two portions-to-be-pressed, which are separate from each other in the circumferential direction of the commutator in the inner surface of the following-recess, are pressed by the pressing projection. Even if the brush wears, rattling of the brush in the circumferential direction of the commutator is suppressed.

In accordance with another aspect of the present invention, a brush device is provided that includes a brush holder extending substantially in a radial direction of a commutator, a brush, and a torsion spring. The brush is accommodated in the brush holder with a gap between the brush holder and the brush. The brush includes a brush-tip end, which comes into contact with the commutator, and a brush-rear end located on a side opposite from the brush-tip end. The torsion spring urges the brush-rear end toward the commutator. The brush holder includes a first inner side surface and a second inner side surface, which are separate from each other in an axial direction of the commutator. The torsion spring urges the brush toward the commutator by pressing a portion-to-be-pressed of the brush-rear end, the portion-to-be-pressed is located at a position deviated in the axial direction of the commutator from a brush-center line as a center line of the brush. The portion-to-be-pressed and the contact location, at which the brush comes into contact with the commutator, are deviated from each other in the axial direction of the commutator. By urging the brush by the torsion spring, the brush-tip end is brought into contact with the first inner side surface and the brush-rear end is brought into contact with the second inner side surface.

According to this disclosure, by urging the brush by the torsion spring, it is possible to apply, to the brush, a rotational force for rotating the brush to deviate the brush-tip end and the brush-rear end in the axial direction of the commutator. The brush, to which the rotational force has been applied, comes into contact with and is pressed against the first inner side surface at its tip end, and the brush is comes into contact with and is pressed against the second inner side surface at its rear end. Since it becomes difficult for the brush to move in the axial direction of the commutator in the brush holder, rattling of the brush in the axial direction of the commutator is suppressed. The brush comes into contact with the commutator in a stable state. The rattling of the brush in the brush holder is suppressed by pressing, by the torsion spring, a portion deviated from the brush-center line at the brush-rear end in the axial direction of the commutator. Therefore, the number of parts is not increased.

This disclosure provides a brush device and a motor capable of suppressing rattling of a brush without increasing the number of parts.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS (First Embodiment)

A first embodiment according to the present disclosure will now be described with reference to FIGS. 1 to 7.

Figure 1:
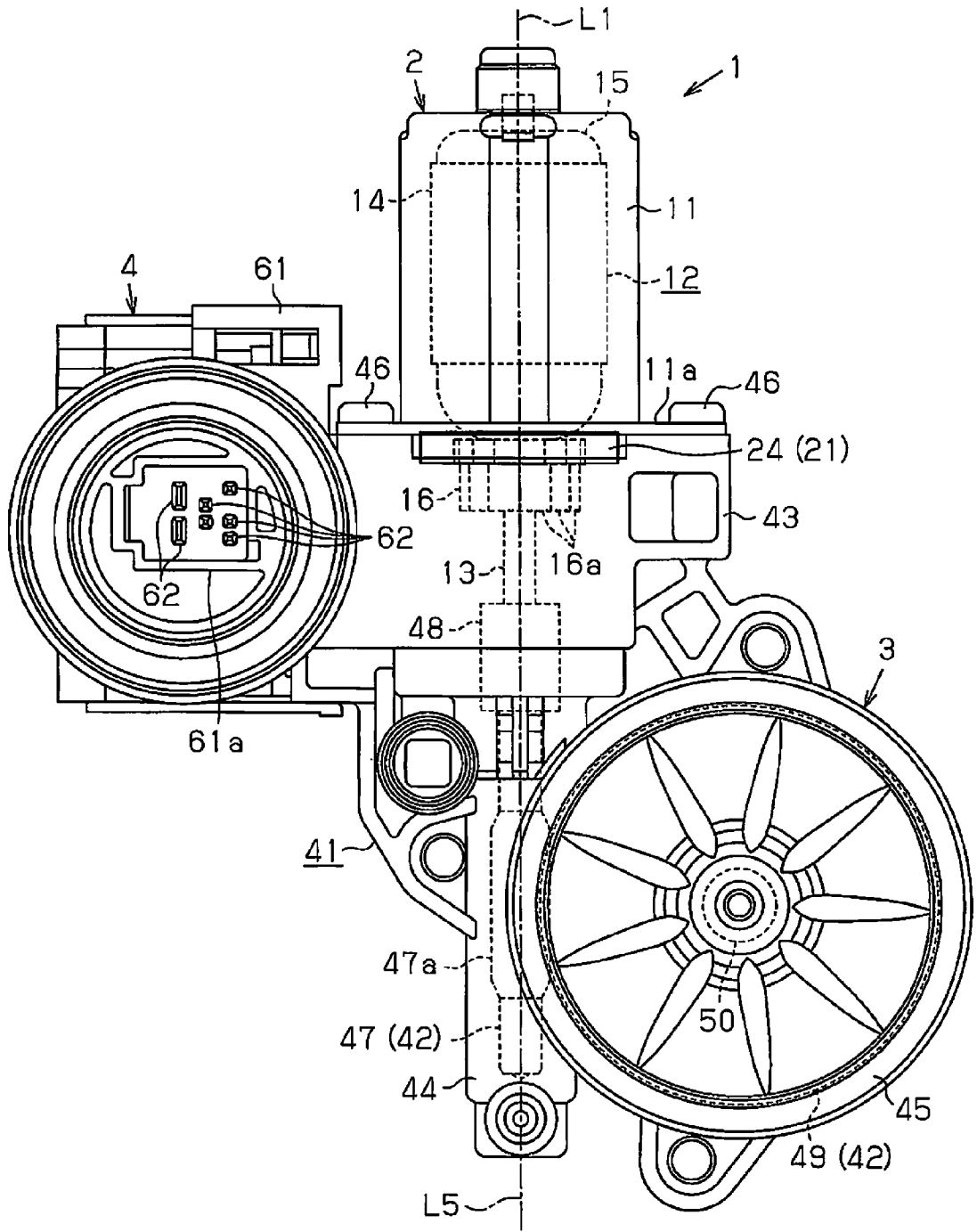
FIG. 1 is a front view of a motor.

A motor 1 of the present embodiment shown in FIG. 1 is used as a drive source of a power window apparatus, which electrically vertically moves a window glass of a vehicle. The motor 1 includes a motor portion 2 located at an upper portion in FIG. 1, a speed reducer 3 provided on an output side of the motor portion 2, i.e., on a lower side of the motor portion 2 in FIG. 1, and a connector portion 4 assembled on the side of the speed reducer 3, i.e., assembled on the left side in FIG. 1.

A yoke 11 as a yoke housing of the motor portion 2 is cylindrical in shape, and one end of the yoke 11, i.e., an upper end thereof in FIG. 1 is closed. A flange portion 11a extending radially outward is formed around an opening of the other end of the yoke 11. A plurality of magnets (not shown) is fixed to the inner peripheral surface of the yoke 11, and an armature 12 is located on inner sides of the magnets.

The armature 12 includes a columnar rotary shaft 13 located at a central portion of the yoke 11 in its radial direction, and an armature core 14 fixed to the rotary shaft 13 such that the armature core 14 can rotate integrally with the rotary shaft 13. The armature 12 further includes a plurality of armature coils 15 wound around the armature core 14, and a commutator 16 fixed to a portion of the rotary shaft 13 closer to its shaft-tip end 13a than the armature core 14, i.e., the commutator 16 is fixed to the rotary shaft 13 in the vicinity of its lower end in FIG. 1.

A shaft-base end 13b of the rotary shaft 13, i.e., an upper end of the rotary shaft 13 in FIG. 1, is supported by a bearing (not shown) provided at a bottom central portion of the yoke 11. A lower end of the rotary shaft 13 in FIG. 1 as the shaft-tip end 13a projects outward of the yoke 11 from the opening of the yoke 11. If a core-mounting portion of the rotary shaft 13 is defined as a portion located in the yoke 11, the armature core 14 is fixed to the core-mounting portion of the rotary shaft 13 such that the armature core 14 is opposed to the magnets (not shown) in the radial direction. If a commutator-mounting portion of the rotary shaft 13 is defined as a portion projecting outward of the yoke 11, the commutator 16 is fitted over and fixed to the commutator-mounting portion of the rotary shaft 13 such that the commutator 16 can integrally rotate with the rotary shaft 13.

The commutator 16 is cylindrical in shape. Segments 16a are provided in parallel to one another at distances from one another such that the segments 16a form the outer peripheral surface of the commutator 16. Some of or all of the segments 16a are electrically connected to the armature coils 15. That is, a power source (not shown) can supply electric power to the armature coils 15 through the segments 16a of the commutator 16. The commutator 16 includes a first commutator end 16b as one end in its axial direction, i.e., as a first end, and a second commutator end 16c as the other end in the axial direction, i.e., as a second end. In this embodiment, the first commutator end 16b is located near the shaft-tip end 13a of the rotary shaft 13, and the second commutator end 16c is located near the shaft-base end 13b.

Figure 2:
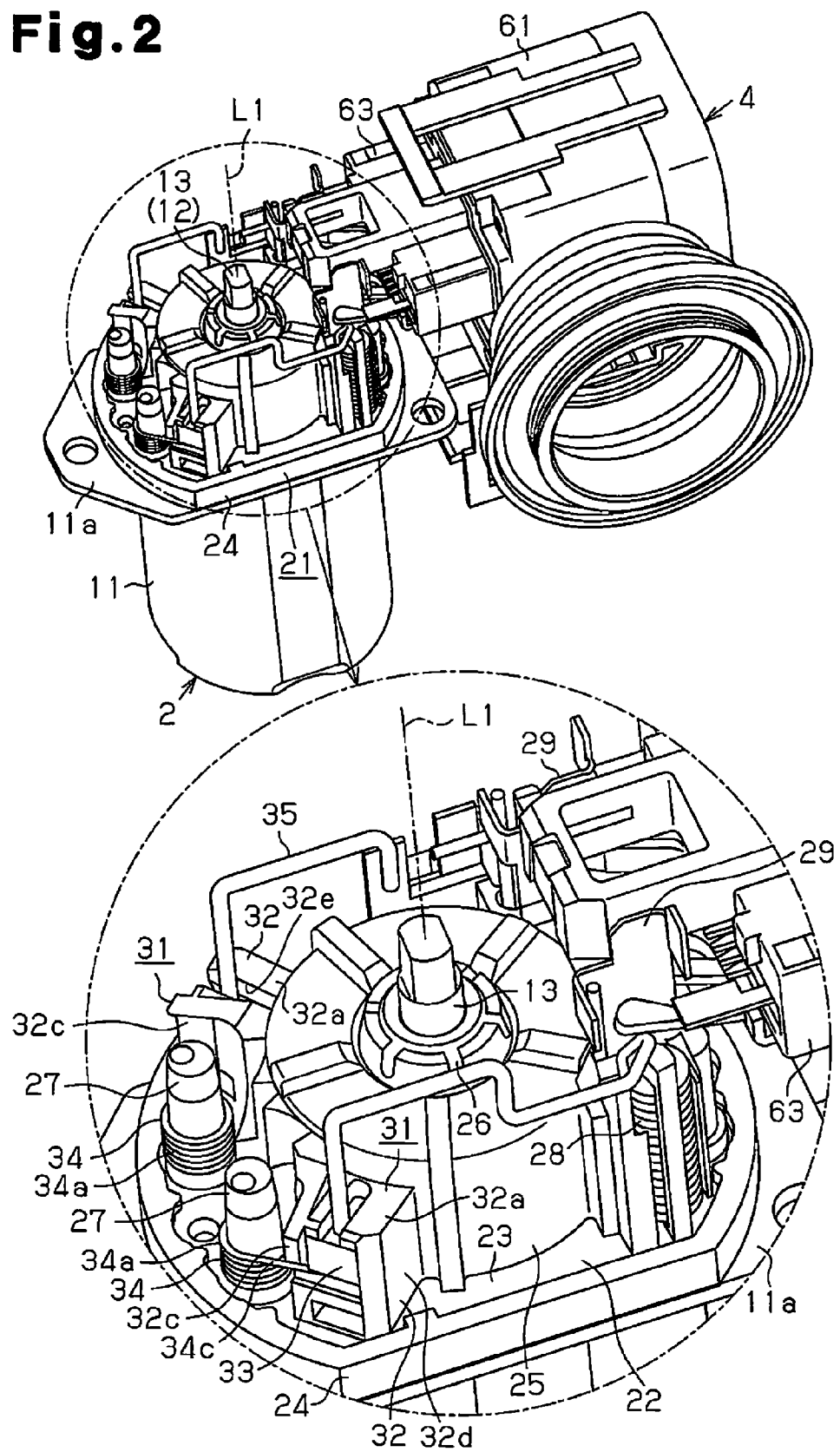
FIG. 2 is a perspective view of a motor portion according to a first embodiment.

As shown in FIGS. 1 and 2, a brush holder assembly 21 constitutes a portion of the motor portion 2. The brush holder assembly 21 is located on an opening of the yoke 11 to substantially close the opening. The brush holder assembly 21 includes a base member 22 located on the opening of the yoke 11, and electronic components and the like are mounted on the base member 22.

The base member 22 is made of insulating plastic material. The base member 22 includes a substantially flat plate-like base portion 23, which closes the opening of the yoke 11. The outer shape of the base portion 23 is formed slightly greater than the opening of the yoke 11. The base portion 23 includes a yoke-opposed surface located on the side of the yoke 11, and a yoke facing surface located on the side opposite from the yoke 11. A columnar support 27 is provided on the outer edge of the base portion 23. A sealing member 24 secures liquid tightness between the yoke 11 and a later-described gear housing 41 of the speed reducer 3. The sealing member 24 is made of elastomer, for example.

Figure 3:
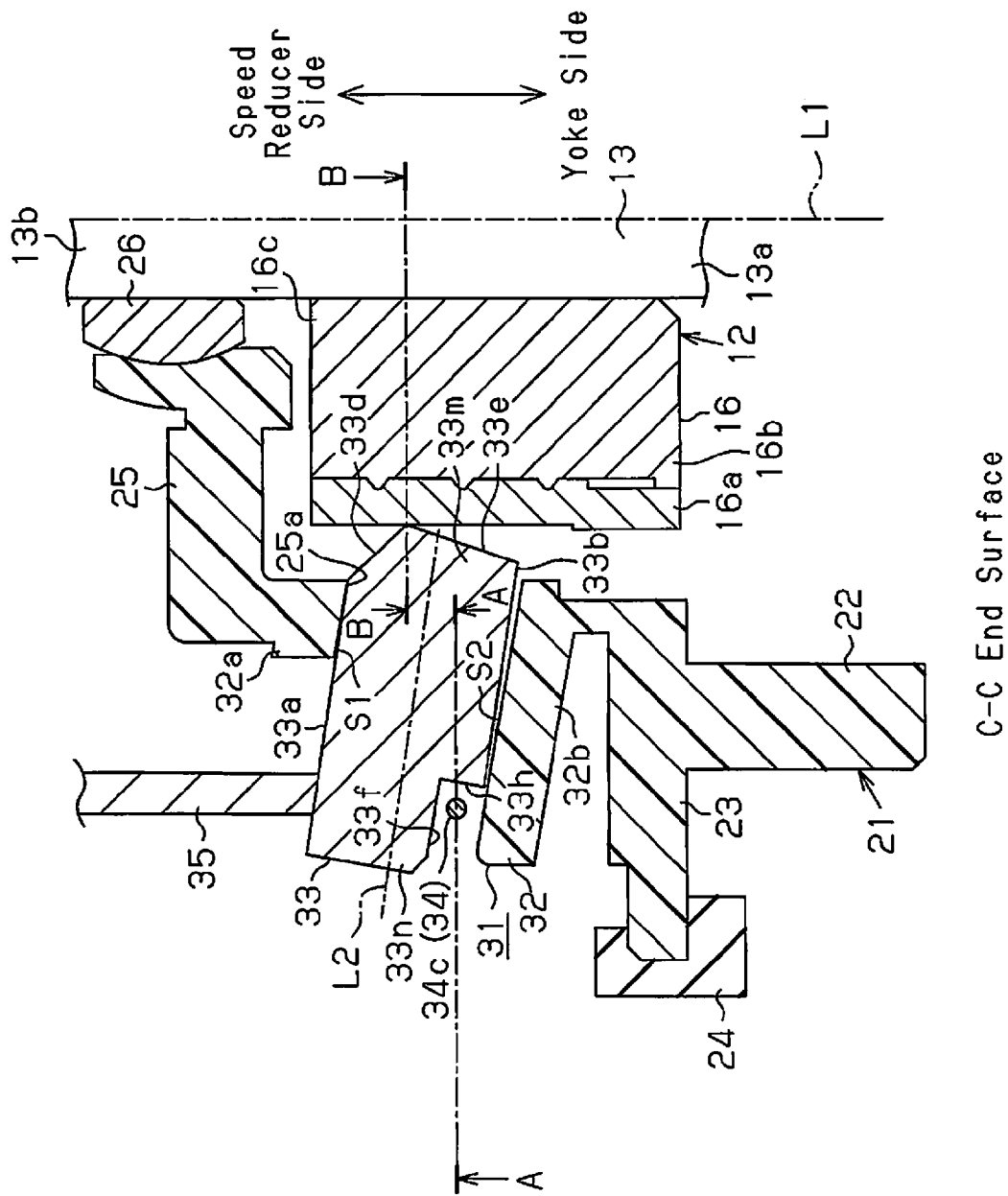
FIG. 3 is an end view of the motor portion shown in FIG. 2, i.e., an end view taken along line C-C in FIG. 4.

As shown in FIGS. 2 and 3, an opening of a cylindrical cover portion 25 having a closed end is extending toward the yoke 11 and is integrally formed with the base portion 23. The cover portion 25 is formed on a central portion of the base portion 23. The cover portion 25 axially projects from the base portion 23 in a direction opposite from the yoke 11, i.e., toward the shaft-tip end 13a. A bearing 26, which supports the shaft-tip end 13a, is held at a bottom central portion of the cover portion 25. The shaft-tip end 13a projects from the opening of the yoke 11. The shaft-tip end 13a passes through a central portion of the cover portion 25 in its radial direction, and penetrates the bottom of the cover portion 25. The shaft-tip end 13a is supported by the bearing 26. That is, the rotary shaft 13 is supported by the bearing 26 and another bearing (not shown) provided at the bottom central portion of the yoke 11. By this support, the rotary shaft 13 can rotate around an axis L1 of the rotary shaft 13. The commutator 16 is accommodated in the cover portion 25.

As shown in FIG. 2, two brush devices 31 are provided on the base portion 23 outside of the cover portion 25 in the radial direction. More specifically, the brush devices 31 are provided on the yoke facing surface of the base portion 23. Each of the two brush devices 31 includes a brush holder 32, a brush 33 held in the brush holder 32, and a torsion spring 34, which urges the brush 33 toward the commutator 16. The brush 33 includes a brush-tip end 33m located close to the rotary shaft 13, and a brush-rear end 33n located on the side opposite from the rotary shaft 13. By urging the brush-rear end 33n, the torsion spring 34 urges the brush 33 toward the commutator 16.

Figure 4:
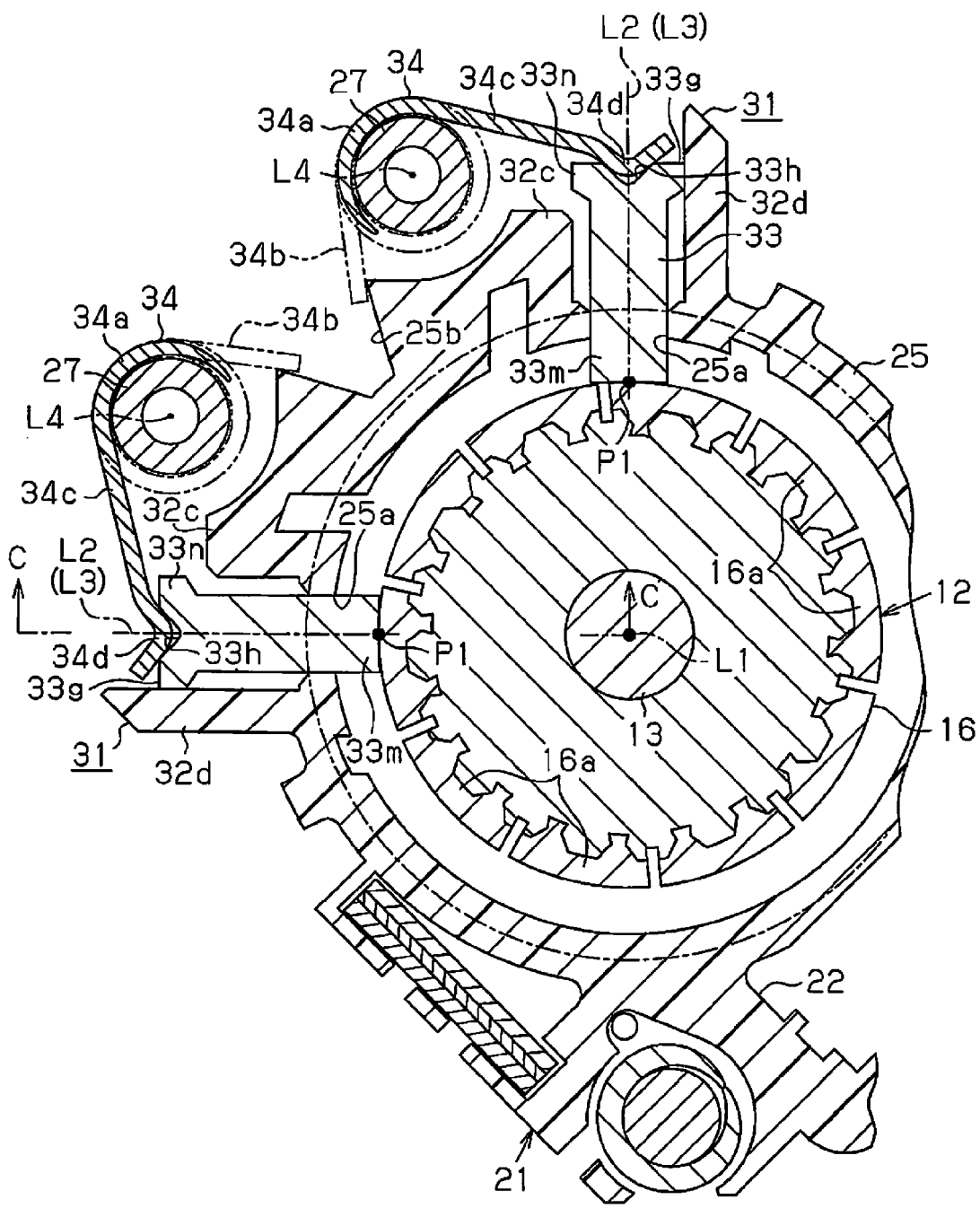
FIG. 4 is an end view of the motor portion shown in FIG. 2, i.e., an end view taken along line A-A line and line B-B in FIG. 3.

The two brush holders 32 are formed at two locations outside of the cover portion 25 in the radial direction. The two locations are separate from each other by 90° in the circumferential direction of the cover portion 25. The two brush holders 32 are integral with the base portion 23. The circumferential direction of the cover portion 25 is the same as the circumferential direction of the commutator 16. Each of the brush holders 32 has a substantially rectangular tubular shape extending substantially in the radial direction of the cover portion 25, i.e., substantially in the radial direction of the commutator 16. As shown in FIGS. 3 and 4, the inner end of the brush holder 32 in the radial direction is integrally formed on the cover portion 25. The interior space of the brush holder 32 communicates with the interior space of the cover portion 25 through an insertion opening 25a formed in the cover portion 25. A region in FIG. 4 outside of a circle that passes through the cover portion 25 and is shown by a dashed-dotted line corresponds to an end view taken along line A-A in FIG. 3. A region in FIG. 4 inside of the circle, which passes through the cover portion 25 and is shown by the alternate long and short dashed line, corresponds to an end view taken along line B-B in FIG. 3.

As shown in FIGS. 2 and 3, each of the brush holders 32 includes a first sidewall 32a and a second sidewall 32b, which are separate from each other in the axial direction of the commutator 16. In this embodiment, the first sidewall 32a is located near the speed reducer 3, the shaft-base end 13b and the second commutator end 16c, and the second sidewall 32b is located near the yoke 11, the shaft-tip end 13a and the first commutator end 16b. Each of the flat plate-like first sidewall 32a and the second sidewall 32b includes two ends, i.e., a radially inner end and a radially outer end with respect to the radial direction of the commutator 16, and the radially inner end is integrally formed with the cover portion 25. The pair of the sidewalls 32a and 32b is inclined toward the first commutator end 16b as they approach the radially inner ends from the radially outer ends. The axial direction of the commutator 16 is the same as that of the axis L1 of the rotary shaft 13.

In the present embodiment, the sidewalls 32a, 32b are inclined such that, as the distance from the commutator 16 decreases, the sidewalls 32a, 32b approach the opening of the cover portion 25. In other words, the sidewalls 32a, 32b approach the yoke 11, or the first commutator end 16b. That is, each of the sidewalls 32a and 32b is inclined with respect to a plane that is perpendicular to the axis L1. The inclination is such that the inner ends of the sidewalls 32a, 32b are relatively closer to the yoke 11 than the outer ends of the sidewalls 32a, 32b. Therefore, as the pair of the sidewalls 32a and 32b approaches the radially inner ends from the radially outer ends, an axial distance between the first sidewall 32a and the base portion 23 is shortened, and an axial distance between the second sidewall 32b and the base portion 23 is also shortened. The pair of the sidewalls 32a and 32b is parallel to each other. In this embodiment, as described above, the brush holder 32 is slightly inclined and extends with respect to the radial direction of the commutator 16.

In this embodiment, the inner side surface of the first sidewall 32a, which is one of the pair of the sidewalls 32a and 32b and located close to the second commutator end 16c, i.e., close to a bottom of the cover portion 25, is referred to a first inner side surface S1. The first inner side surface S1 is inclined such that it approaches the first commutator end 16b as the distance from the radially outer end to the radially inner end decreases, or as the distance from the commutator 16 decreases. That is, the first inner side surface S1 is inclined with respect to a plane that is perpendicular to the axis L1. The inclination is such that the inner end of the first inner side surface S1 is relatively closer to the yoke 11 than the outer end of the first inner side surface S1. The inner surface of the second sidewall 32b, which is the other of the pair of the sidewalls 32a and 32b and located on the side opposite from the cover portion 25, i.e., close to an opening of the cover portion 25, is referred to a second inner side surface S2. The second inner side surface S2 is inclined such that it approaches the first commutator end 16b as the distance from the radially outer end to the radially inner end decreases, or as the distance from the commutator 16 decreases. That is, the second inner side surface S2 is inclined with respect to a plane that is perpendicular to the axis L1. The inclination is such that the inner end of the second inner side surface S2 is relatively closer to the yoke 11 than the outer end of the second inner side surface S2. According to the present embodiment, as described above, the first and second inner side surfaces S1 and S2 are inclined toward the opening of the cover portion 25, i.e., toward the yoke 11 and toward the first commutator end 16b as the first and second inner side surfaces S1 and S2 approach the commutator 16. The first and second inner side surfaces S1 and S2 are flat and separate from each other in the axial direction of the commutator 16.

As shown in FIGS. 2 and 4, each of the brush holders 32 includes a third sidewall 32c and a fourth sidewall 32d. The sidewalls 32c and 32d are separate from each other in the lateral direction of the brush holder 32, i.e., in the circumferential direction of the commutator 16. The pair of the sidewalls 32c and 32d is integrally formed with the pair of the sidewalls 32a and 32b on both sides of the circumferential direction of the pair of the sidewalls 32a and 32b. The pair of the sidewalls 32c and 32d has flat plate-like shapes standing in the axial direction, and they are parallel to each other. Axial ends of the sidewalls 32c and 32d, which are closer to the base portion 23, are integrally formed on the base portion 23. Radially inner ends of the sidewalls 32c and 32d are integrally formed on the cover portion 25.

As shown in FIG. 2, the first sidewall 32a of the brush holder 32 includes an insertion groove 32e through which a pigtail 35 is inserted. The pigtail 35 feeds electric power to the brush 33. The insertion groove 32e extends radially inward from a radially outer end of the first sidewall 32a to a halfway portion of the first sidewall 32a. That is, the insertion groove 32e only opens radially outward with respect to the radial direction of the commutator 16. The insertion groove 32e penetrates the first sidewall 32a in the axial direction of the commutator 16, i.e., opens at both surfaces of the first sidewall 32a in its axial direction.

As shown in FIGS. 3 and 4, the brush 33 has a rectangular pole shape, and is inserted into the brush holder 32. An outside shape of the brush 33 is slightly smaller than a rectangular tubular interior space (inner peripheral surface) of the brush holder 32. Therefore, the brush 33 is accommodated in the brush holder 32 in a state where a gap remains between the brush 33 and the brush holder 32. If the brush 33 is accommodated in the brush holder 32 in the state where the gap remains therebetween in this manner, the brush 33 can move in the radial direction of the commutator 16 in the brush holder 32 without any problem even if the brush 33 thermally expands when the motor portion 2 is driven. The brush-tip end 33m enters from the brush holder 32 into the cover portion 25 through the insertion opening 25a, and can come into contact with the outer peripheral surface of the commutator 16. The brush 33 is located between the first and second inner side surfaces S1 and S2. The first and second inner side surfaces S1 and S2 are inclined toward the first commutator end 16b as they approach the commutator 16. Therefore, the brush 33 is inclined from the brush-rear end 33n to the brush-tip end 33m toward the first commutator end 16b. That is, the brush 33 is inclined from the brush-rear end 33n to the brush-tip end 33m with respect to the radial direction of the commutator 16 toward the axial end of the commutator 16 near the yoke 11. The brush 33 includes a first brush side surface 33a, which is opposed to the first inner side surface S1 of the brush holder 32 in the axial direction, and a second brush side surface 33b, which is opposed to the second inner side surface S2 of the brush holder 32 in the axial direction. The first brush side surface 33a and the second brush side surface 33b are mutually parallel flat surfaces.

As shown in FIG. 3, the size of the brush-tip end 33m in the axial direction of the commutator 16 is formed such that the brush-tip end 33m gradually becomes narrower from the brush-rear end 33n to the brush-tip end 33m, i.e., as the brush-tip end 33m approaches the commutator 16. That is, the brush-tip end 33m is pointed in a triangular shape. The state where the brush-tip end 33m is pointed in a triangular shape is a state before a pre-conditioning interim operation of the motor 1 is carried out, i.e., a state before the brush 33 wears. A pair of inclined surfaces 33d and 33e is formed on the brush-tip end 33m. The distance between the inclined surfaces 33d and 33e in a direction parallel to the rotary shaft 13 becomes narrower toward the brush-tip end 33m.

Figure 5:
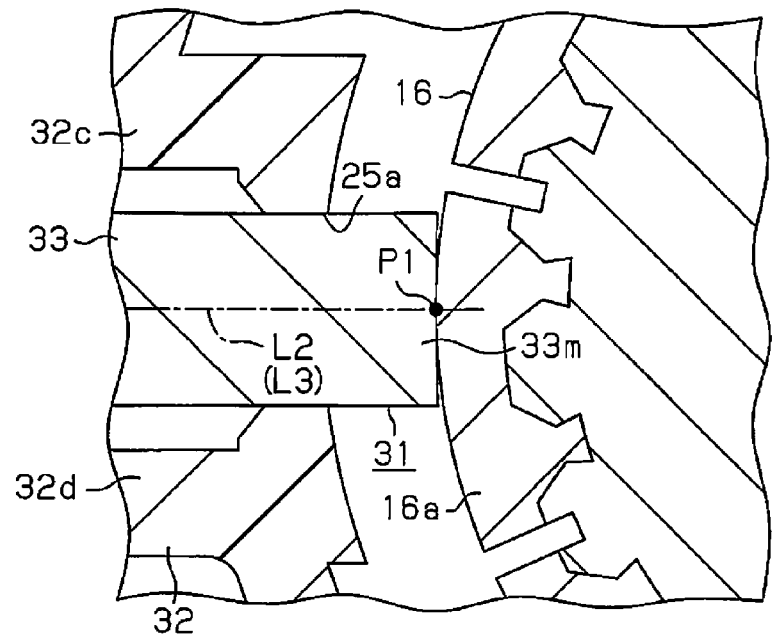
FIG. 5 is an enlarged view of the motor portion shown in FIG. 2 in the vicinity of the brush-tip end.

As shown in FIG. 5, when the brush-tip end 33m after the pre-conditioning interim operation is viewed from the axial direction of the commutator 16, the brush-tip end 33m is recessed in the form of an arc substantially along the outer peripheral surface of the commutator 16. That is, when the brush-tip end 33m is viewed from the axial direction of the commutator 16, the brush-tip end 33m has an arcuate form that is line symmetry with respect to a brush-center line L2. The brush-center line L2 is a straight line extending from the brush-tip end 33m to the brush-rear end 33n and passing through a center of the brush 33. The radius of curvature of an end surface of the brush-tip end 33m which is recessed in the arcuate form is greater than the radius of curvature of the outer peripheral surface of the commutator 16. Hence, a central portion of the brush-tip end 33m in its circumferential direction comes into contact with the outer peripheral surface of the commutator 16. In this embodiment, the central portion of the brush-tip end 33m in the circumferential direction comes into point contact with the outer peripheral surface of the commutator 16, or into surface contact close to point contact with the outer peripheral surface of the commutator 16, where a contact area of the brush-tip end 33m is small. The state close to the point contact includes a line contact. As shown in FIG. 3, in a state where the brush-tip end 33m held by the brush holder 32 comes into contact with the outer peripheral surface of the commutator 16, a gap exists between the inclined surfaces 33d and 33e and the outer peripheral surface of the commutator 16.

As shown in FIG. 3, a step recess 33f is formed in the brush-rear end 33n. The step recess 33f is recessed such that a step that is recessed in the direction of the brush-center line L2 is formed in the brush-rear end 33n. The step recess 33f is formed in the brush-rear end 33n at a location close to the first commutator end 16b. That is, in this embodiment, the first commutator end 16b is one axial end of the commutator 16 close to the opening of the cover portion 25, and the step recess 33f of the brush 33 is formed in the vicinity of the first commutator end 16b. That is, in this embodiment, the step recess 33f is formed in the second brush side surface 33b of the brush-rear end 33n opposed to the yoke 11.

Figure 6:
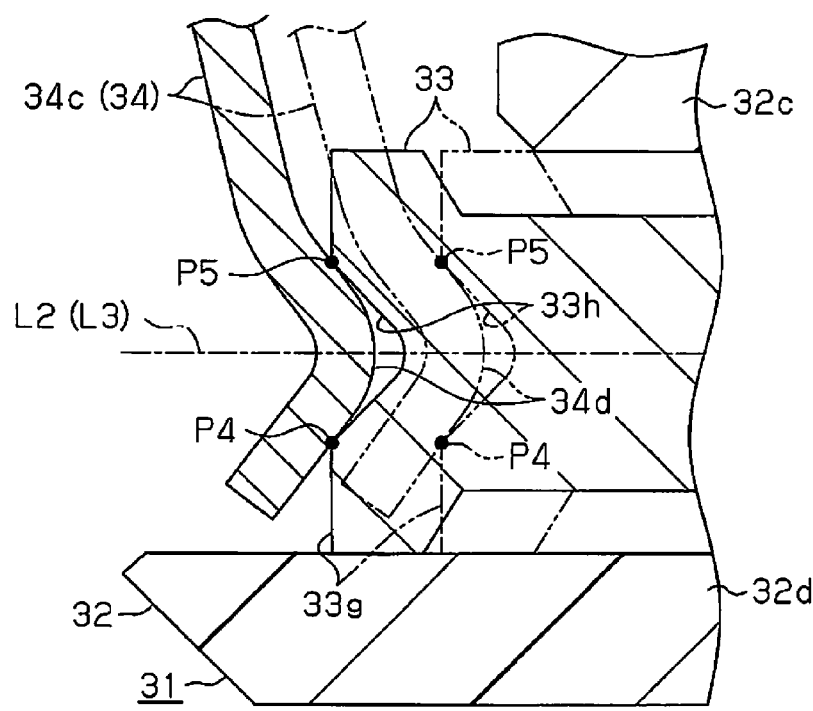
FIG. 6 is an enlarged view of the motor portion shown in FIG. 2 in the vicinity of the brush-rear end.

As shown in FIG. 3, a portion of the inner surface of the step recess 33f that is oriented to a direction opposite to the brush-tip end 33m, i.e., oriented radially outward of the commutator 16, is referred to as a pressing surface 33g. The pressing surface 33g intersects the brush-center line L2 at right angles. As shown in FIG. 6, a following-recess 33h, which opens on the side opposite from the brush-tip end 33m, is formed in a central portion of the flat pressing surface 33g. As shown in FIGS. 4 and 6, a contact location between the commutator 16 and the brush 33 is referred to as a contact point P1. A straight line that passes through the contact point P1 and is parallel to the brush-center line L2 is referred to as a contact center line L3. When the following-recess 33h is viewed from the axial direction of the commutator 16, the following-recess 33h is formed in a region of the pressing surface 33g including the contact center line L3. In this embodiment, the contact point P1 is located at a central portion of the brush-tip end 33m in its circumferential direction. Therefore, when the brush 33 is viewed from the axial direction of the commutator 16, the contact center line L3 matches with the brush-center line L2.

The following-recess 33h is recessed in the brush-rear end 33n such that the size of the following-recess 33h in a direction in the circumferential direction of the commutator 16 gradually becomes narrower from the opening of the following-recess 33h to a bottom thereof. As shown in FIGS. 4 and 6, in this embodiment, the cross-sectional shape of the following-recess 33h taken along a plane intersecting the axial direction of the commutator 16 is a substantially V-shape that opens in a direction opposite from the brush-tip end 33m. The cross sectional shape of the following-recess 33h is symmetric with respect to the brush-center line L2 or the contact center line L3.

As shown in FIGS. 2 and 4, the torsion spring 34 includes a spring coil portion 34a, a latching portion 34b projecting from a base end of the spring coil portion 34a, and a pressing portion 34c projecting from a tip end of the spring coil portion 34a. The columnar supports 27 are formed on the yoke facing surface of the base portion 23 in the vicinity of the respective brush holders 32. Each of the columnar supports 27 is columnar in shape, extends in the axial direction of the commutator 16, and has an outer diameter substantially equal to the inner diameter of the spring coil portion 34a as a coil portion. Each of the columnar supports 27 is inserted into the spring coil portion 34a of the torsion spring 34 to support the torsion spring 34. A spring center line L4 as an axis of the spring coil portion 34a is substantially parallel to the axial direction of the commutator 16. A plurality of spring latching grooves 25b are formed in the outer peripheral surface of the cover portion 25 between the two columnar supports 27. The latching portions 34b of the torsion springs 34 are each inserted into the spring latching grooves 25b and are latched to the base portion 23.

A tip end of the pressing portion 34c of each of the torsion springs 34 comes into contact with the brush-rear end 33n, thereby urging the brush 33 toward the commutator 16. An insertion groove (not shown) through which the pressing portion 34c is inserted is formed in the third sidewall 32c of the brush holder 32. The pressing portion 34c is in contact with the brush-rear end 33n through the insertion groove. The insertion groove extends in the radial direction of the commutator 16, and the insertion groove allows the pressing portion 34c to move toward the commutator 16.

As shown in FIGS. 4 and 6, a pressing projection 34d projecting toward the brush-rear end 33n is formed on a tip end of the pressing portion 34c, i.e., one end of the torsion spring. When the pressing projection 34d is viewed from the axial direction of the commutator 16, the pressing projection 34d projects toward the brush-rear end 33n in an arcuate form. The size of the pressing projection 34d in the circumferential direction of the commutator 16 is formed wider than the size of the following-recess 33h in the circumferential direction of the commutator 16.

Figure 7:
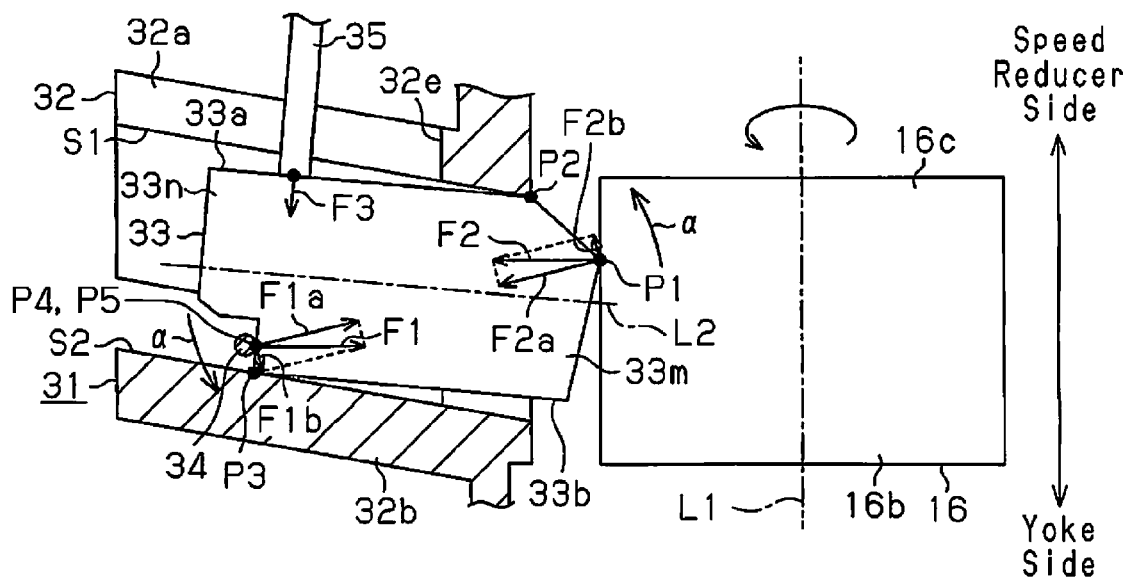
FIG. 7 is a schematic diagram of the brush device in FIG. 2.

A tip end of the pressing projection 34d of the torsion spring 34 is inserted into the following-recess 33h. The pressing projection 34d presses, toward the commutator 16, the inner surface (inner peripheral surface) of the following-recess 33h or a boundary between the inner surface of the following-recess 33h and the pressing surface 33g. The torsion spring 34 presses the inner surface of the following-recess 33h by means of the pressing projection 34d, thereby urging the brush 33 toward the commutator 16. The spring center line L4 of the torsion spring 34 is substantially parallel to the axial direction of the commutator 16. Therefore, the torsion spring 34 urges the brush 33 in a direction substantially parallel to the radial direction of the commutator 16. As shown in FIG. 7, the pressing projection 34d presses the inner surface of the following-recess 33h and according to this, the torsion spring 34 presses pressing points P4 and P5 of the brush-rear end 33n as portions close to the first commutator end 16b with respect to the brush-center line L2. As shown in FIGS. 3 and 7, the pressing points P4 and P5 of the brush 33 pressed by the torsion spring 34 and the contact point P1 between the brush 33 and the commutator 16 are deviated from each other in the axial direction of the commutator 16.

As shown in FIGS. 4 and 6, the pressing projection 34*d* inserted into the following-recess 33*h* presses the two pressing points P4 and P5, and these two pressing points P4 and P5 are located on the inner surface of the following-recess 33*h* or at the boundary between the inner surface of the following-recess 33*h* and the pressing surface 33*g*. The two pressing points P4 and P5 are separate from each other in the circumferential direction of the commutator 16. In this embodiment, the size of the pressing projection 34*d* in the circumferential direction of the commutator 16 is formed wider than the size of the following-recess 33*h* in the circumferential direction of the commutator 16. That is, the curvature of the pressing projection 34*d* is smaller than that of the following-recess 33*h*. In this case, the pressing projection 34*d* presses both circumferential ends of the following-recess 33*h*. If the pressing points P4 and P5 as two portions-to-be-pressed pressed by the pressing projection 34*d* in the inner surface of the following-recess 33*h* are viewed from the axial direction of the commutator 16, the pressing points P4 and P5 are provided one each on each of both sides of the brush-center line L2 or the contact center line L3.

As shown in FIG. 7, an urging force F1 of the torsion spring 34 and reaction force F2 received from the commutator 16 caused when the brush 33 is urged by the torsion spring 34 are applied to the brush 33. When the brush 33 is viewed from the circumferential direction of the commutator 16, i.e., in a state shown in FIG. 7, the urging force F1 of the torsion spring 34 is resolved into a component force F1*a* along a straight line (not shown) connecting the pressing points P4 and P5 and the contact point P1 with each other and a component force F1*b* intersecting the component force F1*a* at right angles. The reaction force F2 is also resolved into a component force F2*a* along a straight line (not shown) connecting the pressing points P4 and P5 and the contact point P1 with each other and a component force F2*b* intersecting the component force F2*a* at right angles. The component force F1*b* urges the brush-rear end 33*n* toward the second inner side surface S2. The component force F2*b* urges the brush-tip end 33*m* toward the first inner side surface S1. The component forces F1*b* and F2*b* thus generated by urging the brush 33 by the torsion spring 34 deviate the brush-tip end 33*m* and the brush-rear end 33*n* in opposite directions from each other in the axial direction of the commutator 16. That is, the component forces F1*b* and F2*b* apply, to the brush 33, a rotational force, i.e., rotation moment, for rotating the brush 33 in the direction of the arrow α in FIG. 7. The rotation moment caused by the component forces F1*b* and F2*b* increases an axial deviation amount between the brush-tip end 33*m* and the brush-rear end 33*n* in the axial direction of the commutator 16. The brush 33, to which the rotational force is applied, is inclined in the axial direction of the commutator 16 in the brush holder 32 with respect to the brush holder 32. The brush-tip end 33*m* comes into contact with and is pressed against the first inner side surface S1 in the tip end of the brush holder 32, and the brush-rear end 33*n* comes into contact and is pressed against the second inner side surface S2 in the rear end of the brush holder 32. A contact location between the brush 33 and the first inner side surface S1 is referred to as a first contact support point P2, and a contact location between the brush 33 and the second inner side surface S2 is referred to as a second contact support point P3.

As shown in FIGS. 2 and 3, a first end of the pigtail 35 is connected to the brush-rear end 33*n*. The pigtail 35 supplies electric power to the brush 33. In this embodiment, the pigtail 35 is connected to a portion of the brush-rear end 33*n*, which is located on the side opposite, with respect to the brush-center line L2, from the pressing points P4 and P5 as the portions-to-be-pressed of the brush 33 pressed by the torsion spring 34. Therefore, the first end of the pigtail 35 is connected to the first brush side surface 33*a* of the brush-rear end 33*n*, which is close to the second commutator end 16*c*. As shown in FIG. 2, the pigtail 35 is pulled outside of the brush holder 32 through the insertion groove 32*e* formed in the first sidewall 32*a* of the brush holder 32. Second ends of the pigtails 35 are each electrically connected to feed terminals 29 held by the base portion 23 through a chock coil 28 fixed to the base portion 23. Only one of the chock coils 28 is shown in FIG. 2. The chock coil 28 is a noise-cancelling device for deleting noise included in electric power supplied to the armature 12.

As shown in FIG. 1, the speed reducer 3 includes the gear housing 41 and a speed reducing mechanism 42 accommodated in the gear housing 41. The gear housing 41 includes a holder accommodating portion 43 fixed to the flange portion 11*a* of the yoke 11, a worm shaft accommodating portion 44 extending from the holder accommodating portion 43 in the direction opposite from the yoke 11 in the direction of the axis L1 of the rotary shaft 13, and a worm wheel accommodating portion 45 formed on the side of the worm shaft accommodating portion 44, i.e., on the right side in FIG. 1.

The holder accommodating portion 43 abuts against the flange portion 11*a* from the axial direction of the rotary shaft 13, and is fixed to the flange portion 11*a* with a plurality of screws 46. According to this design, the gear housing 41 is fixed to the yoke 11. The shaft-tip end 13*a* enters the holder accommodating portion 43, and the commutator 16 is located in the holder accommodating portion 43. The cover portion 25, the brush device 31 and the like are located in the holder accommodating portion 43. That is, portions of the brush holder assembly 21, which project outside of the yoke 11 from the opening thereof are accommodated in the holder accommodating portion 43.

A substantially columnar worm shaft 47 is accommodated in the worm shaft accommodating portion 44. A thread-shaped worm portion 47*a* is formed at a substantially central portion of the worm shaft 47 in its axial direction. The worm shaft 47 is arranged coaxially with the rotary shaft 13, i.e., such that mutual axes L1 and L5 match with each other. The worm shaft 47 can rotate around the axis L5 in the worm shaft accommodating portion 44. The base end of the worm shaft 47 is connected to the shaft-tip end 13*a* of the rotary shaft 13 through a clutch 48 located in the holder accommodating portion 43. The base end of the worm shaft 47 is an upper end in FIG. 1. The clutch 48 transmits a rotation drive force of the rotary shaft 13 to the worm shaft 47, and operates not to transmit a rotational force from the worm shaft 47 to the rotary shaft 13.

The interior space of the worm wheel accommodating portion 45 is connected to the interior space of the worm shaft accommodating portion 44. A disk-like worm wheel 49, which meshes with the worm portion 47*a*, is accommodated in the worm wheel accommodating portion 45. The speed reducing mechanism 42 includes the worm wheel 49 and the worm shaft 47. An output shaft 50 extending in the axial direction of the worm wheel 49 is provided on a central portion of the worm wheel 49 in its radial direction such that the output shaft 50 can integrally rotate with the worm wheel 49. The tip end of the output shaft 50 projects outward of the gear housing 41. A window glass of a vehicle is connected to the tip end of the output shaft 50 through a window regulator (not shown).

As shown in FIG. 1, the connector portion 4 is assembled into the holder accommodating portion 43. An opening (not shown) is formed in the holder accommodating portion 43 on a side opposite from the worm wheel accommodating portion 45 with respect to the axis L1 of the rotary shaft 13, i.e., on the left side in FIG. 1. The connector portion 4 is inserted into the holder accommodating portion 43 from this opening. As shown in FIGS. 1 and 2, the connector portion 4 includes a connector housing 61 fixed to the gear housing 41, a plurality of external connection terminals 62 held in the connector housing 61 and a control IC 63. The external connection terminals 62 are electrically connected to the control IC 63 in the connector housing 61. The external connection terminals 62 are exposed outside of the connector housing 61 from inside of a cylindrical external connecting portion 61a formed in the connector housing 61. If the connector portion 4 is inserted into the holder accommodating portion 43, the control IC 63 is electrically connected to the two feed terminals 29. If an external connector (not shown) which inputs and outputs an electric signal and supplies electricity is connected to the external connecting portion 61a, the external connection terminals 62 are electrically connected to the external connector.

Operation of the motor 1 of this embodiment including the brush device 31 configured as described above will be described below.

Electric power supplied from the external connector to the connector portion 4 is supplied from the control IC 63 to the brush 33 through the feed terminal 29 and the pigtail 35. The electric power supplied to the brush 33 is supplied to the armature coils 15 through the commutator 16. As a result, the rotary shaft 13 of the armature 12 is rotated. The rotation drive force of the rotary shaft 13 is transmitted to the worm shaft 47 through the clutch 48. The rotation drive force is decelerated in the worm portion 47a and the worm wheel 49, and is output from the output shaft 50. The window glass connected to the output shaft 50 through the window regulator moves downward or upward in accordance with a rotation direction of the output shaft 50.

As shown in FIG. 7, in each of the brush devices 31, the component force F1b of the urging force F1 of the torsion spring 34 and the component force F2b of the reaction force F2 received by the brush 33 from the commutator 16 when the brush 33 is urged by the torsion spring 34 are applied to the brush 33. The component forces F1b and F2b apply rotational force, i.e., rotation moment in the direction of the arrow α to the brush 33. The rotational force in the direction of the arrow α acts to rotate the brush 33 such that the brush-tip end 33m and the brush-rear end 33n deviate in the axial direction of the commutator 16. The brush-tip end 33m of the brush 33, which has received the rotational force, comes into contact with the first inner side surface S1 on the first brush side surface 33a, and the brush-rear end 33n comes into contact with the second inner side surface S2 on the second brush side surface 33b. Force of the torsion spring 34 for rotating the brush 33 is received by the brush holder 32 at total two locations, i.e., at the first contact support point P2 and the second contact support point P3. The first contact support point P2 is located at a tip end of the brush holder 32 on the first inner side surface S1. The second contact support point P3 is located on the second inner side surface S2 closer to a rear end of the brush holder 32 than the first contact support point P2. That is, of the brush holder 32, the brush 33 is supported by the first contact support point P2 and the second contact support point P3, which deviate from each other in the radial direction of the commutator 16, i.e., in the direction of the brush-center line L2 are located on both sides of the brush-center line L2.

The pigtail 35 is connected to a portion of the brush-rear end 33n that is located on the side opposite from the pressing points P4 and P5 of the brush 33 pressed by the torsion spring 34 with respect to the brush-center line L2. Force applied from the pigtail 35 to the brush-rear end 33n is referred to as a pigtail force F3. The pigtail force F3 is applied in a direction in which the urging force of the torsion spring 34 acts to rotate the brush-rear end 33n, i.e., in a direction substantially the same as the direction of the arrow α in FIG. 7. Therefore, the pigtail force F3 applied from the pigtail 35 to the brush 33 is also applied to push the brush-rear end 33n toward the second inner side surface S2.

Before the pre-conditioning interim operation of the motor 1 is carried out, the brush-tip end 33m is pointed in the triangular shape. When the pre-conditioning interim operation of the motor 1 is carried out, the triangular shape of the brush-tip end 33m starts wearing. As the brush-tip end 33m wears, a contact area between the brush-tip end 33m and the outer peripheral surface of the commutator 16 increases. As shown in FIG. 5, an end surface of the brush-tip end 33m eventually becomes arcuately curved along the outer peripheral surface of the commutator 16 when the end surface is viewed from the axial direction of the commutator 16. That is, the brush-tip end 33m becomes a shape such that the inclined surfaces 33d and 33e that exist before the pre-conditioning interim operation of the motor 1 is carried out are eliminated, i.e., such that the triangular pointed portion of the brush-tip end 33m is eliminated. As a result, the brush-tip end 33m becomes the square pole portion, which is the thickest portion of the brush 33, and the entire substantially rectangular tip end surface of the rectangular pole portion can slide on the outer peripheral surface of the commutator 16. Therefore, the brush 33 stably slides on the commutator 16.

As shown in FIGS. 4 and 6, if the brush-tip end 33m wears, the torsion spring 34 urges the brush 33 toward the commutator 16. According to this urging operation, the brush-rear end 33n gradually moves toward the commutator 16, i.e., radially inward. In FIG. 6, an alternate long and two short dashed line shows the brush-rear end 33n after it has moved radially inward. At this time, as the brush 33 wears, the pressing portion 34c of the torsion spring 34 rotates around the spring coil portion 34a. See the pressing portion 34c shown by the alternate long and two short dashed line in FIG. 6. That is, even if the brush 33 wears, the outer peripheral surface of the pressing projection 34d, which projects toward the brush-rear end 33n in the arcuate form slides on the inner surface of the following-recess 33h or on the boundary between the inner surface of the following-recess 33h and the pressing surface 33g. Hence, in the pressing points P4 and P5 each existing on each of both sides of the contact center line L3 or the brush-center line L2, a state where the pressing projection 34d presses the inner surface of the following-recess 33h is maintained.

As described above, the first embodiment has the following advantages.

(1) The torsion spring 34 presses the pressing points P4 and P5 of the brush-rear end 33n, which are deviated in the axial direction of the commutator 16 from the brush-center line L2. Hence, it is easy for the torsion spring 34 to apply, to the brush 33, a rotational force for rotating the brush 33 such that the deviation amount between the brush-tip end 33m and the brush-rear end 33n in the axial direction of the commutator 16 is increased. The brush-tip end 33m of the brush 33 to which the rotational force is applied comes into contact with and is pressed against the first inner side surface S1, and the brush-rear end 33n of the brush 33 comes into contact with and is pressed against the second inner side surface S2. Hence, since it becomes difficult for the brush 33 to move in the axial direction of the commutator 16 in the brush holder 32, rattling and irregular movement of the brush 33 in the axial direction of the commutator 16 are suppressed. Therefore, the brush 33 comes into contact with the commutator 16 in a stable state. Further, the torsion spring 34 presses the pressing points P4 and P5 of the brush-rear end 33n, which deviate from the brush-center line L2 in the axial direction of the commutator 16. According to this pressing effect, the rattling and the irregular movement of the brush 33 in the brush holder 32 are suppressed. Therefore, it is unnecessary to sandwich a plate-like pressing member between the torsion spring 34 and the brush-rear end 33n and thus, the number of parts is not increased.

(2) The first and second inner side surfaces S1 and S2 of the brush holder 32 are inclined such that as these inner surfaces approach the commutator 16, they approach the first commutator end 16b. The torsion spring 34 presses the pressing points P4 and P5 of the brush-rear end 33n, which are located close to the first commutator end 16b with respect to the brush-center line L2. Hence, if the torsion spring 34 urges, by the urging force F1, the brush-rear end 33n in a direction substantially parallel to the radial direction of the commutator 16, the brush 33 is easily rotated such that the deviation amount between the brush-tip end 33m and the brush-rear end 33n in the axial direction of the commutator 16 is increased. That is, the urging force F1 may urge the brush 33 in a direction that is parallel to the radial direction of the commutator 16 or may urge the brush 33 slightly diagonally. Therefore, the brush-tip end 33m comes into contact with the first inner side surface S1 and the brush-rear end 33n comes into contact with the second inner side surface S2. Hence, according to the present embodiment, the direction in which the torsion spring 34 urges the brush 33 need not be a complicated direction in which the urging direction is intentionally inclined with respect to the radial direction of the commutator 16, for example. Therefore, according to the present embodiment, it is possible to restrain a structure of the brush device 31 from becoming complicated.

(3) The torsion spring 34 presses the pressing points P4 and P5 of the brush-rear end 33n, which are located closer to the first commutator end 16b than the brush-center line L2. The brush 33 is in contact with the commutator 16 through the contact point P1 near the second commutator end 16c with respect to the brush center line L2. According to the present embodiment, it is therefore easy to increase the rotational force for rotating the brush 33 to increase the deviation amount between the brush-tip end 33m and the brush-rear end 33n in the axial direction of the commutator 16, the rotational force being generated by urging the brush 33 by the torsion spring 34. Therefore, according to the present embodiment, the first inner side surface S1 can strongly press the brush-tip end 33m, and the second inner side surface S2 can strongly press the brush-rear end 33n. Hence, since it becomes more difficult for the brush 33 to move in the axial direction of the commutator 16 in the brush holder 32, rattling of the brush 33 in the axial direction of the commutator 16 is further effectively suppressed.

(4) The rotational force for rotating the brush 33 to increase the deviation amount between the brush-tip end 33m and the brush-rear end 33n in the axial direction of the commutator 16 is generated by urging, by the torsion spring 34, the brush 33 accommodated in the brush holder 32, which is inclined with respect to the radial direction of the commutator 16. The pigtail 35 applies, to the brush 33, force in a direction substantially the same as that of the rotational force. Hence, according to the present embodiment, since it becomes more difficult for the brush 33 to move in the axial direction of the commutator 16 in the brush holder 32, the rattling of the brush 33 in the axial direction of the commutator 16 is further suppressed.

(5) The single contact point P1 of the brush 33 is in contact with the commutator 16. The torsion spring 34 presses the two pressing points P4 and P5 of the brush-rear end 33n, which are separate from each other in the circumferential direction of the commutator 16. The portions-to-be-pressed of the brush 33, which are pressed by the torsion spring 34, i.e., the pressing points P4 and P5 are provided each on each of the both sides of the contact center line L3 when the pressing points P4 and P5 are viewed from the axial direction of the commutator 16. The contact center line L3 passes through the contact location between the brush 33 and the commutator 16, i.e., through the contact point P1, and the contact center line L3 is parallel to the brush-center line L2. Therefore, the brush 33 is restrained from rattling or irregularly moving in the circumferential direction of the commutator 16 in the brush holder 32.

(6) The pressing projection 34d of the torsion spring 34 has the arcuate form projecting toward the brush-rear end 33n when the pressing projection 34d is viewed from the axial direction of the commutator 16. Therefore, according to the present embodiment, even if the pressing portion 34c rotates as the brush 33 wears, it is possible to maintain the state where the pressing projection 34d presses the two pressing points P4 and P5 of the brush-rear end 33n. The two pressing points P4 and P5 are separate from each other in the circumferential direction of the commutator 16 and sandwich the contact center line L3 on the inner surface of the following-recess 33h or at the boundary between the inner surface of the following-recess 33h and the pressing surface 33g. Hence, even if the brush 33 wears, the rattling of the brush 33 in the circumferential direction of the commutator 16 is suppressed.

(7) The motor 1 includes the brush device 31 in which rattling and irregular movement of the brush 33 in the brush holder 32 are suppressed. Hence, in the motor 1, generation of noise caused by the rattling of the brush 33 is suppressed. Since the brush 33 is in contact with the commutator 16 in the stable state, it is possible to restrain the brush 33 from wearing excessively. Therefore, it is possible to restrain the lifetime of the brush 33 from being reduced, and the lifetime of the motor 1 is increased.

(Second Embodiment)

A second embodiment in which this disclosure is embodied will be described with reference to FIGS. 8 to 10. The same constituent members as those of the first embodiment are designated with the same symbols, and description thereof will be omitted.

Figure 8:
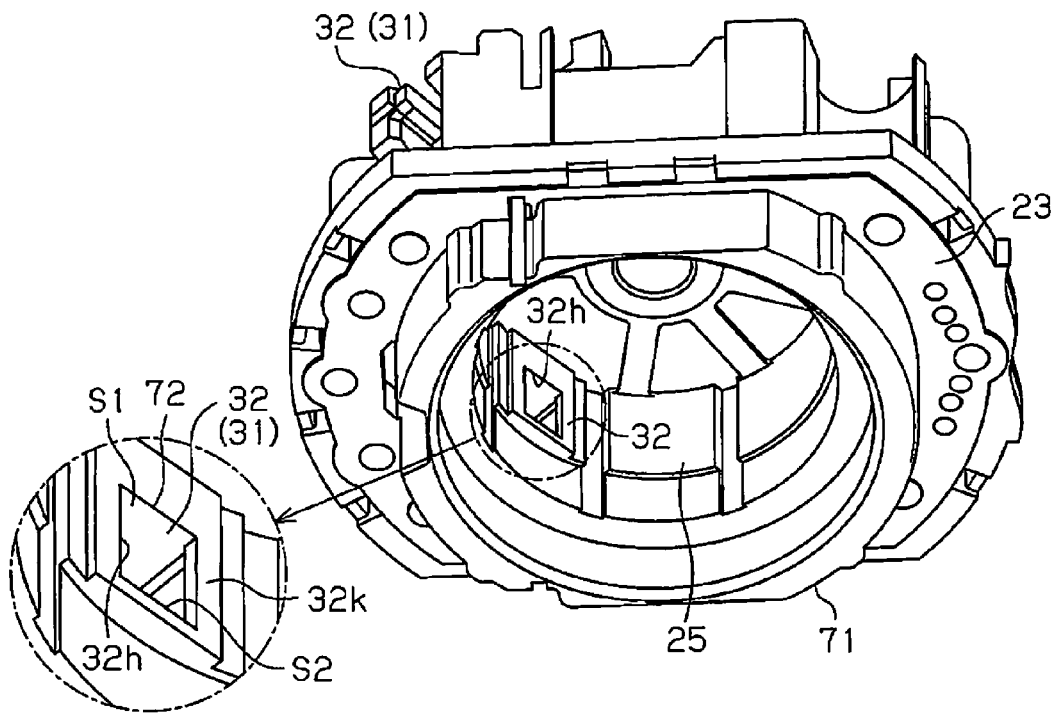
FIG. 8 is a perspective view of a base member according to a second embodiment.

FIG. 8 shows a base member 71 according to the second embodiment. In the second embodiment, a brush holder assembly 21 of a motor 1 includes a base member 71 instead of the base member 22 of the first embodiment. Like the base member 22 of the first embodiment, the base member 71 is made of insulating plastic material, and the base member 71 includes a brush holder 32 and a cover portion 25, which constitute a portion of a brush device 31.

FIG. 8 shows the brush holders 32 of the two brush devices 31 of the second embodiment. As shown in FIGS. 8 and 10, the inner radial end of each of the brush holders 32 slightly projects inward of the cover portion 25. That is, an inner opening 32h of the brush holder 32 that opens inward of the cover portion 25 is formed in the inner radial end of the brush holder 32. The interior space of each of the brush holders 32 communicates with the interior space of the cover portion 25 through the inner opening 32h. The inner opening 32h is formed into a rectangular shape so that the brush 33 is inserted into the inner opening 32h.

Figure 9:
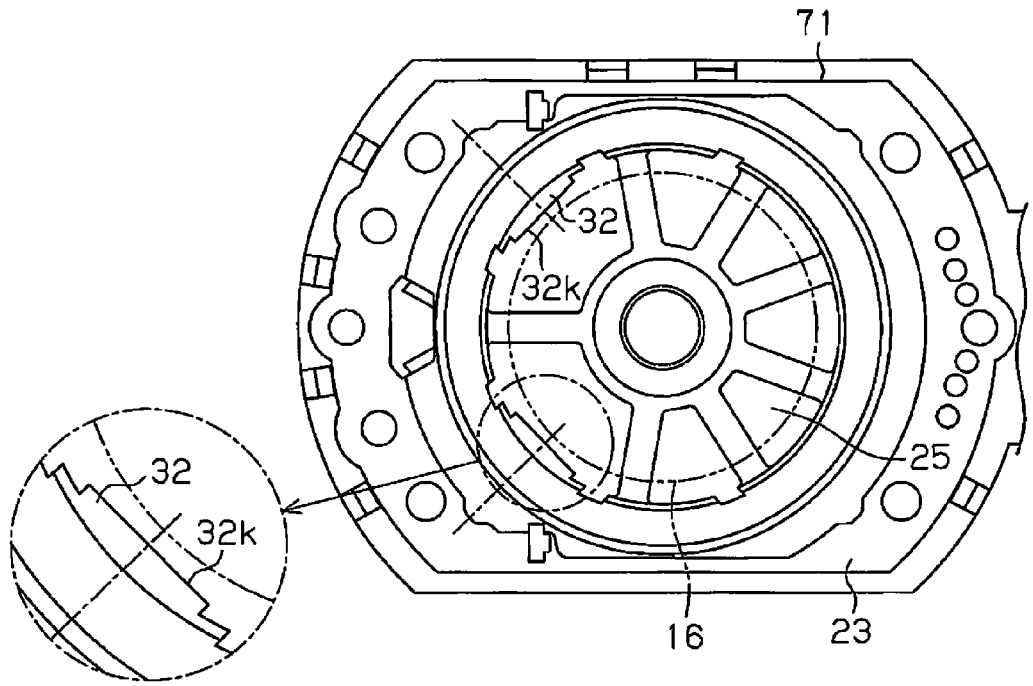
FIG. 9 is a plan view of the base member shown in FIG. 8.
Figure 10:
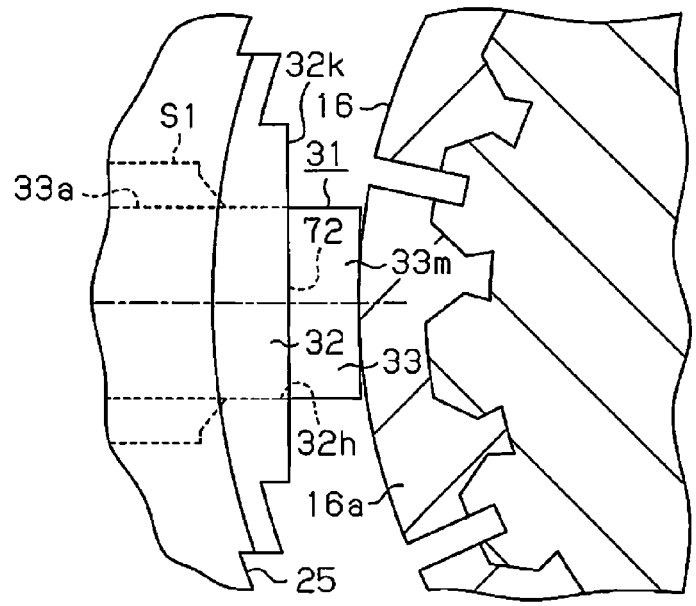
FIG. 10 is an enlarged view of the motor portion shown in FIG. 8 in the vicinity of a brush-tip end.

As shown in FIG. 9, a flat surface portion 32k is formed on the inner radial end surface of each of the brush holders 32 projecting inward of the cover portion 25, i.e., formed on a peripheral edge of the inner opening 32h of a tip end surface of the brush holder 32. The flat surface portion 32k is parallel to the axial direction of a commutator 16 accommodated in the cover portion 25, and intersects an extending direction of the brush holder 32 at right angles. The extending direction of the brush holder 32 is a radial direction of the commutator 16 as in the first embodiment, and the extending direction is shown by an alternate long and short dashed-dotted line in FIGS. 9 and 10. The axial direction of the commutator 16 is perpendicular to sheet surfaces of FIGS. 9 and 10.

FIGS. 8 and 9 show radially inner ends of a first inner side surface S1 and a second inner side surface S2. The radially inner ends of the first and second inner side surfaces S1 and S2 extend to the inner opening 32h. An end of the first inner side surface S1 close to the commutator 16 has a straight line portion 72. The straight line portion 72 intersects the axial direction of the commutator 16 at right angles, and intersects the extending direction of the brush holder 32 at right angles. Since the first inner side surface S1 extends radially inward to the inner opening 32h, the straight line portion 72 constitutes a portion of the inner opening 32h. The straight line portion 72 is one side of the first inner side surface S1 close to the commutator 16, and the straight line portion 72 is one straight line located at a corner formed by the first inner side surface S1 and the flat surface portion 32k. As shown in FIGS. 8 and 10, a length of the straight line portion 72. That is, the size of the straight line portion 72 in a direction intersecting the extending direction of the brush holder 32 as viewed from the axial direction of the commutator 16 is slightly longer than the size of the brush 33 in the same direction, i.e., longer than the width of the brush 33.

The brush 33 inserted in the brush holder 32 in each of the brush devices 31 is urged by a torsion spring 34 toward the commutator 16 like in the first embodiment shown in FIGS. 4 and 7. That is, the torsion spring 34 urges the brush 33 toward the commutator 16 to press a brush-rear end 33n. The torsion spring 34 applies, to the brush 33, a rotational force for rotating the brush 33 to increase the deviation amount between a brush-tip end 33m and the brush-rear end 33n in the axial direction of the commutator 16. The brush 33, to which the rotational force has been applied, is inclined in the axial direction of the commutator 16 in the brush holder 32 with respect to the brush holder 32. The brush-tip end 33m is pressed against the first inner side surface S1, and the brush-rear end 33n comes into contact with and is pressed against the second inner side surface S2. In this embodiment, the brush-tip end 33m projects into the cover portion 25 from the inner opening 32h. The first inner side surface S1 extends radially inward to the inner opening 32h. Hence, the brush-tip end 33m comes into line contact with the straight line portion 72 on the first brush side surface 33a.

Operation of the motor 1 including the brush devices 31 of the present embodiment will be described below.

In each of the brush devices 31, since the brush-tip end 33m comes into contact with the straight line portion 72, the brush-tip end 33m comes into line contact with the first inner side surface S1. The straight line portion 72 intersects the axial direction of the commutator 16 at right angles, and intersects the extending direction of the brush holder 32 at right angles. Therefore, the brush-tip end 33m is pressed against the straight line portion 72 by the urging force of the torsion spring 34, and the brush-tip end 33m comes into line contact with the straight line portion 72. Hence, the attitude of the brush 33 is easily stabilized.

As described above, the second embodiment has the following advantages in addition to the advantages similar to those of (1) to (7) of the first embodiment.

(8) The end of the first inner side surface S1 close to the commutator 16 includes the straight line portion 72, the straight line portion 72 intersects the axial direction of the commutator 16 at right angles, and intersect the extending direction of the brush holder 32. In each of the brush devices 31, the brush-tip end 33m is pressed against the straight line portion 72 by the urging force of the torsion spring 34, and comes into line contact with the straight line portion 72. Therefore, the attitude of the brush 33 is easier to be stabilized. Thus, the rattling and the irregular movement of the brush 33 are further suppressed, and the brush 33 comes into contact with the commutator 16 in a more stable state.

The embodiments of this disclosure may be changed as follows.

In the above described embodiments, the motor 1 is used as the drive source of the power window apparatus, which vertically moves a window glass of a vehicle electrically. However, the motor 1 may be used as a drive source of an apparatus other than the power window apparatus. The brush device 31 may be provided in a motor having no speed reducer.

In the second embodiment, the brush-tip end 33m comes into line contact with the straight line portion 72. However, if the straight line portion 72 has a certain width, i.e., if the straight line portion 72 is a thin and long surface, the brush-tip end 33m may come into surface contact with the straight line portion 72. In this case also, an advantage similar to (8) of the second embodiment can be obtained. If the brush-tip end 33m is pressed against the second inner side surface S2 by the urging force of the torsion spring 34 unlike the above-described configuration, an end of the second inner side surface S2 close to the commutator 16 may be provided with the straight line portion 72. In this case also, the straight line portion 72 intersects the axial direction of the commutator 16 at right angles, and intersects the extending direction of the brush holder 32.

In the above described embodiments, the following-recess 33h is formed on the brush-rear end 33n. However, the brush 33 does not necessarily need to include the following-recess 33h. In this case, an even number of pressing projections may be formed on the pressing portion 34c of the torsion spring 34. The pressing projections, the number of which is even, are formed such that they project toward the brush-rear end 33n and they are separate from one another in the circumferential direction of the commutator 16. The pressing projections, the number of which is even, press an even number of pressing portions of the brush-rear end 33n, and the pressing portions are separate from one another in the circumferential direction of the commutator 16. According to this configuration, it is possible to restrain the brush 33 from rattling and irregularly moving in the circumferential direction of the commutator 16 in the brush holder 32. If the portions-to-be-pressed, where the plurality of pressing projections press the brush 33, are deviated from the brush-center line L2 in the axial direction of the commutator 16 in the brush-rear end 33n, and if the same number of these portions-to-be-pressed are provided on both sides of the contact center line L3 as viewed from the axial direction of the commutator 16, the brush 33 comes into contact with the commutator 16 in the stable state.

In the first embodiment, the pigtail 35 is connected to the portion-to-be-pressed of the brush 33 of the brush-rear end 33n, which is pressed by the torsion spring 34, i.e., to portions of the brush-rear end 33n on the side opposite from the pressing points P4 and P5 with respect to the brush-center line L2. However, as long as the pigtail 35 is connected to a portion of the brush-rear end 33n, the pigtail 35 may be connected to a location different from that of the first embodiment. For example, the pigtail 35 may be connected to a side surface of the brush 33 of the brush-rear end 33n, which is opposed to the circumferential direction of the commutator 16. That is, the pigtail 35 may be connected to a surface of the brush-rear end 33n, which is perpendicular to the circumferential direction of the commutator 16. The same applies to the brush device 31 of the second embodiment.

Figure 11:
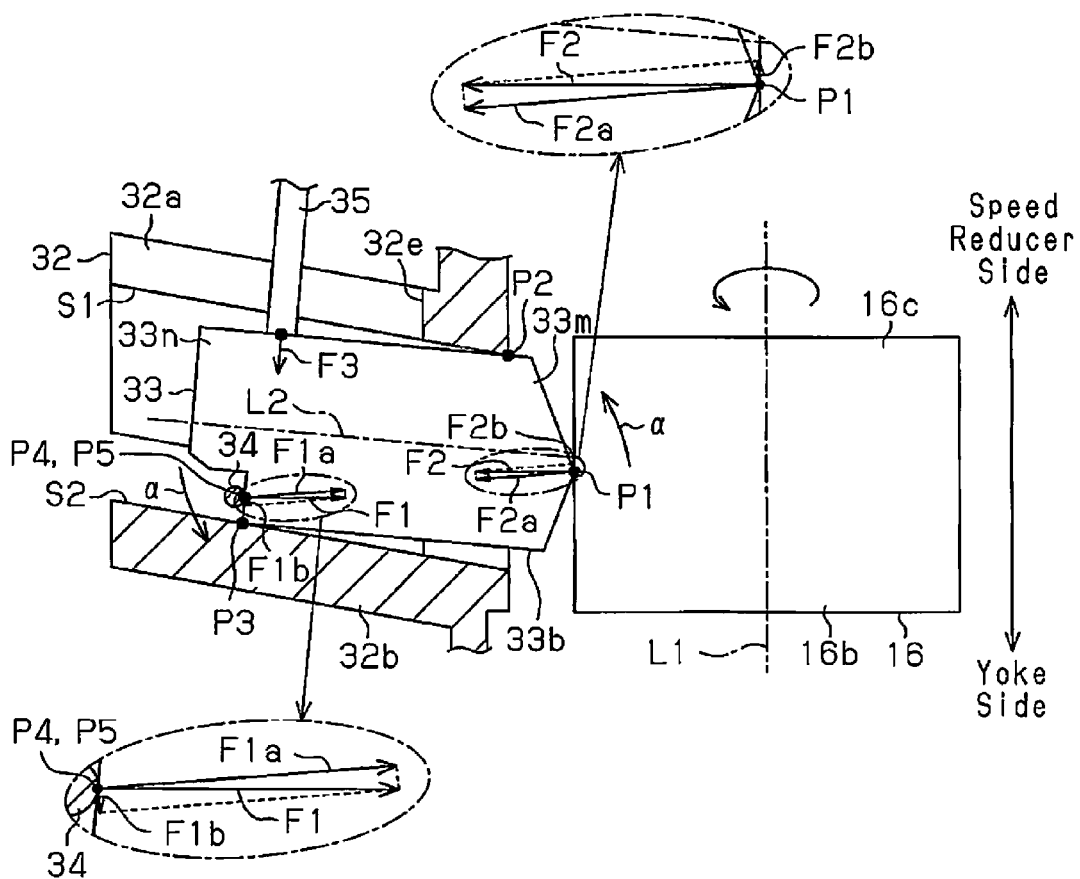
FIG. 11 is a schematic diagram of a brush device according to another embodiment.

In the first embodiment, the torsion spring 34 presses the portion of the brush-rear end 33n in the vicinity of the first commutator end 16b with respect to the brush-center line L2, i.e., the pressing points P4 and P5 of the brush-rear end 33n in the vicinity of the yoke 11. The brush 33 is in contact with the commutator 16 at the contact point P1 in the vicinity of the second commutator end 16c with respect to the brush-center line L2, i.e., in the vicinity of the speed reducer 3. Alternatively, as shown in FIG. 11, the brush 33 may be in contact with the commutator 16 at the contact point P1 in the vicinity of the first commutator end 16b with respect to the brush-center line L2, i.e., in the vicinity of the yoke 11. In FIG. 11, the same constituent members as those of the first embodiment are designated with the same symbols. In an example shown in FIG. 11, the torsion spring 34 urges the brush 33 in the direction substantially parallel to the radial direction of the commutator 16. In FIG. 11, the pressing points P4 and P5 and the contact point P1 are located close to the first commutator end 16b with respect to the brush-center line L2. However, when they are viewed from the circumferential direction of the commutator 16, i.e., in a state shown in FIG. 11, the contact point P1 between the brush 33 and the commutator 16 and the pressing points P4 and P5 of the brush 33 pressed by the torsion spring 34 are deviated from each other in the axial direction of the commutator 16. In this case also, advantages similar to those of (1) and (4) of the first embodiment can be obtained. The same applies to the brush device 31 of the second embodiment.

Figure 12:
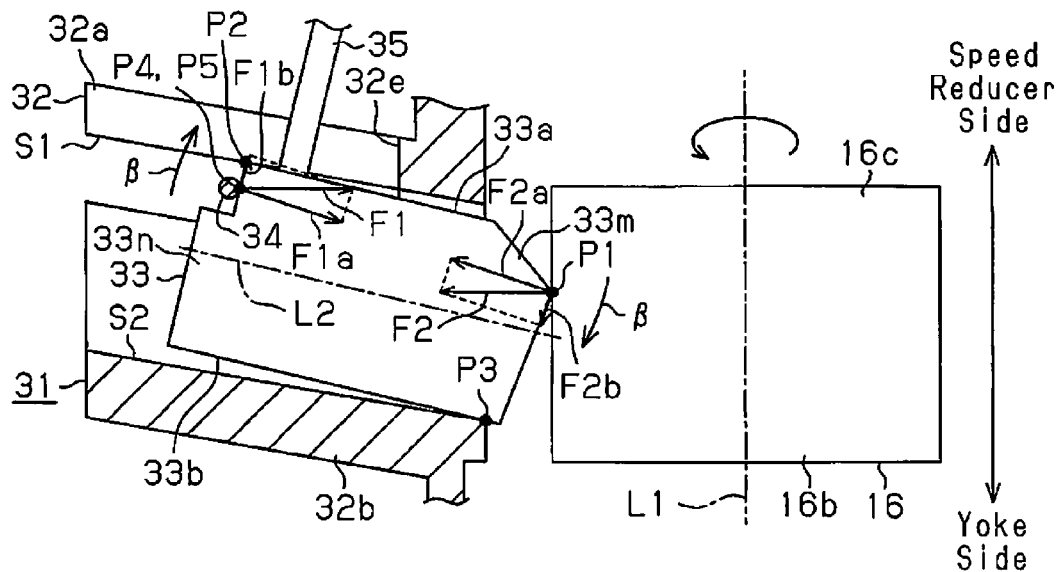
FIG. 12 is a schematic diagram of a brush device according to yet another embodiment.

In the first embodiment, the first and second inner side surfaces S1 and S2 are inclined such that they approach the first commutator end 16b as they approach the commutator 16, i.e., such that they approach the yoke 11. The torsion spring 34 presses the pressing points P4 and P5 of the brush-rear end 33n in the vicinity of the first commutator end 16b with respect to the brush-center line L2, i.e., in the vicinity of the yoke 11. Alternatively, as shown in FIG. 12, the torsion spring 34 may press the pressing points P4 and P5 of the brush-rear end 33n in the vicinity of the second commutator end 16c with respect to the brush-center line L2, i.e., in the vicinity of the speed reducer 3. In FIG. 12, the same constituent members as those of the first embodiment are designated with the same symbols. In an example shown in FIG. 12, the torsion spring 34 urges the brush 33 in the direction substantially parallel to the radial direction of the commutator 16. As viewed from the circumferential direction of the commutator 16, i.e., in FIG. 12, the pressing points P4 and P5 of the brush 33 pressed by the torsion spring 34 and the contact point P1 between the brush 33 and the commutator 16 are deviated from each other in the axial direction of the commutator 16. In FIG. 12, the pressing points P4 and P5 and the contact point P1 are located in the vicinity of the second commutator end 16c with respect to the brush-center line L2. The component forces F1b and F2b apply, to the brush 33, the rotational force in the direction of an arrow β which is opposite from the arrow α. According to this configuration also, an advantage similar to (1) of the first embodiment can be obtained. The same applies to the brush device 31 of the second embodiment.

Figure 13:
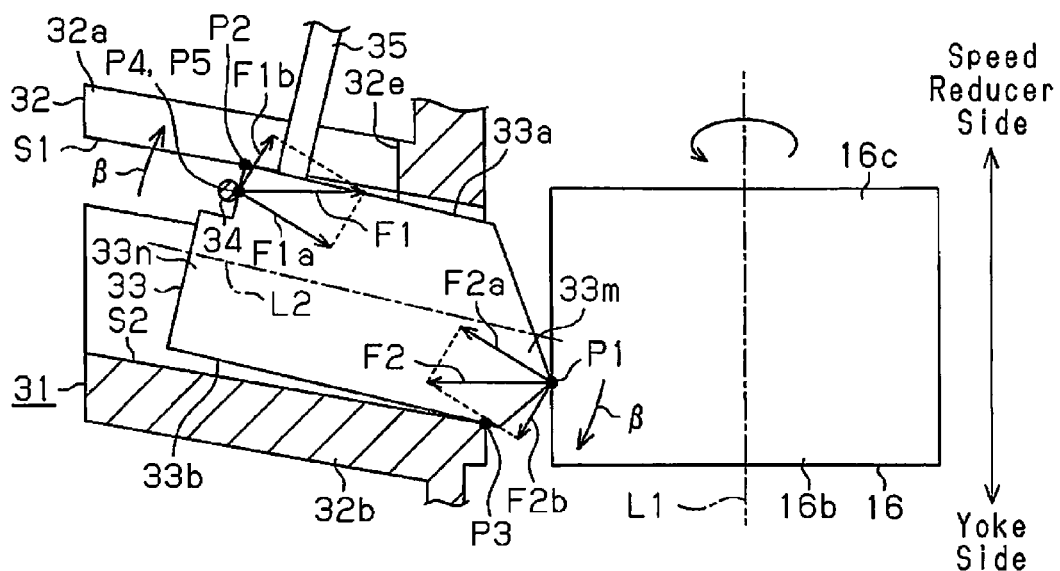
FIG. 13 is a schematic diagram of a brush device according to yet another embodiment.

As shown in FIG. 13, when the torsion spring 34 presses the pressing points P4 and P5 of the brush-rear end 33n located closer to the second commutator end 16c than the brush-center line L2, i.e., located close to the speed reducer 3, contact locations between the brush 33 and the commutator 16, i.e., the contact point P1 may be set closer to the first commutator end 16b than the brush-center line L2, i.e., may be set close to the yoke 11. In FIG. 13, the same constituent members as those of the first embodiment are designated with the same symbols. In an example shown in FIG. 13, the torsion spring 34 urges the brush 33 in the direction substantially parallel to the radial direction of the commutator 16. In FIG. 13, the pressing points P4 and P5 are located close to the second commutator end 16c with respect to the brush-center line L2, and the contact point P1 is located close to the first commutator end 16b with respect to the brush-center line L2. As viewed from the circumferential direction of the commutator 16, i.e., in FIG. 13, the pressing points P4 and P5 of the brush 33 pressed by the torsion spring 34 and the contact point P1 between the brush 33 and the commutator 16 are deviated from each other in the axial direction of the commutator 16. The component forces F1b and F2b apply the rotational force in the direction of the arrow β to the brush 33. According to this configuration also, an advantage similar to (1) of the first embodiment can be obtained. The same applies to the brush device 31 of the second embodiment.

In each of the above described embodiments, the first and second inner side surfaces S1 and S2 are inclined such that as they approach the commutator 16, they approach the first commutator end 16b. Alternatively, the first and second inner side surfaces S1 and S2 may be inclined such that as they approach the commutator 16, they approach the second commutator end 16c. Alternatively, the first and second inner side surfaces S1 and S2 may be formed such that they intersect the axial direction of the commutator 16 at right angles, i.e., such that they are parallel to the radial direction of the commutator 16 without inclining with respect to the radial direction of the commutator 16. In this case also, the torsion spring 34 is configured to press the pressing points P4 and P5 of the brush-rear end 33n, which are deviated from the brush-center line L2 in the axial direction of the commutator 16. According to this configuration, the pressing points P4 and P5 of the brush 33 pressed by the torsion spring 34 and the contact point P1 of the brush 33 with respect to the commutator 16 are deviated in the axial direction of the commutator 16. According to this configuration also, an advantage similar to (1) of the first embodiment can be obtained.

The number of the brush devices 31 provided in the motor 1 is not limited to two, and the number may be three or more.

The invention claimed is:

1. A brush comprising:
a brush holder extending substantially in a radial direction of a commutator;
a brush accommodated in the brush holder with a gap between the brush holder and the brush, the brush including a brush-tip end, which comes into contact with the commutator, and a brush-rear end located on a side opposite to the brush-tip end; and
a torsion spring, which urges the brush-rear end toward the commutator, wherein
the brush holder includes a first inner side surface and a second inner side surface, which are separate from each other in an axial direction of the commutator,
the torsion spring urges the brush toward the commutator by pressing a portion-to-be-pressed of the brush-rear end, and the portion-to-be-pressed is located at a position deviated in the axial direction of the commutator from a brush-center line as a center line of the brush, by urging the brush by the torsion spring, the brush-tip end is brought into contact with the first inner side surface and the brush-rear end is brought into contact with the second inner side surface, the commutator includes a first commutator end, which is a first end in the axial direction, and a second commutator end, which is a second end on a side opposite from the first commutator end, the first inner side surface and the second inner side surface are inclined such that as they approach the commutator, they approach the first commutator end, the portion-to-be-pressed of the brush-rear end is located near the first commutator end with respect to the brush-center line of the brush-rear end, and the brush comes into contact with the commutator near the second commutator end with respect to the brush-center line.

2. A brush device comprising:

a brush holder extending substantially in a radial direction of a commutator;

a brush accommodated in the brush holder with a gap between the brush holder and the brush, the brush including a brush-tip end, which comes into contact with the commutator, and a brush-rear end located on a side opposite to the brush-tip end; and a torsion spring, which urges the brush-rear end toward the commutator, wherein the brush holder includes a first inner side surface and a second inner side surface, which are separate from each other in an axial direction of the commutator, the torsion spring urges the brush toward the commutator by pressing a portion-to-be-pressed of the brush-rear end, and the portion-to-be-pressed is located at a position deviated in the axial direction of the commutator from a brush-center line as a center line of the brush, by urging the brush by the torsion spring, the brush-tip end is brought into contact with the first inner side surface and the brush-rear end is brought into contact with the second inner side surface, the portion-to-be-pressed is one of an even number of portions-to-be-pressed that are separate from one another in a circumferential direction of the commutator, the brush comes into contact with the commutator at one contact location of the brush, and if a straight line that passes through the contact location and is parallel to the brush-center line is defined as a contact center line, the torsion spring presses the portions-to-be-pressed of the brush-rear end, and the same number of portions-to-be-pressed exist on each side of the contact center line when the commutator is viewed from its axial direction.

3. The brush device according to claim 2, wherein a following-recess, which opens on a side opposite from the brush-tip end, is formed in the brush-rear end, the torsion spring includes an urging end, which urges the brush-rear end, and when the urging end is viewed form the axial direction of the commutator, the urging end has a pressing projection, which projects toward the brush-rear end in an arcuate form, and in an inner surface of the following-recess, two of the portions-to-be-pressed that are separate from each other in the circumferential direction of the commutator are pressed by the pressing projection by inserting the pressing projection into the following-recess.

4. A brush device comprising:

a brush holder extending substantially in a radial direction of a commutator;

a brush accommodated in the brush holder with a gap between the brush holder and the brush, the brush including a brush-tip end, which comes into contact with the commutator and a brush-rear end located on a side opposite from the brush-tip end; and a torsion spring, which urges the brush-rear end toward the commutator, wherein the torsion spring presses an even number of portions-to-be-pressed of the brush-rear end that are separate from one another in a circumferential direction of the commutator.

5. The brush device according to claim 4, wherein the brush comes into contact with the commutator at one contact location of the brush, a brush-center line as a center line of the brush passes through the contact location when the commutator is viewed from its axial direction, the portion-to-be-pressed is one of an even number of portions-to-be-pressed, and the same number of portions-to-be-pressed exist on each side of the brush-center line when the commutator is viewed from the axial direction.

6. The brush device according to claim 4, wherein a following-recess, which opens on a side opposite from the brush-tip end, is formed in the brush-rear end, an end of the torsion spring includes a pressing projection projecting toward the brush-rear end in an arcuate form when the commutator is viewed from the axial direction, the pressing projection is inserted into the following-recess, the number of the even number of portions-to-be-pressed is two, and the two portions-to-be-pressed are separate from each other in the circumferential direction of the commutator in an inner surface of the following-recess.

\* \* \* \* \*